US012510452B2

United States Patent
Cui et al.

(10) Patent No.: US 12,510,452 B2
(45) Date of Patent: Dec. 30, 2025

(54) MODULUS SENSOR

(71) Applicant: Nanyang Technological University, Singapore (SG)

(72) Inventors: Zequn Cui, Singapore (SG); Xiaodong Chen, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 399 days.

(21) Appl. No.: 18/255,252

(22) PCT Filed: Nov. 30, 2021

(86) PCT No.: PCT/SG2021/050738
§ 371 (c)(1),
(2) Date: May 31, 2023

(87) PCT Pub. No.: WO2022/119502
PCT Pub. Date: Jun. 9, 2022

(65) Prior Publication Data
US 2024/0102903 A1    Mar. 28, 2024

(30) Foreign Application Priority Data
Dec. 4, 2020    (SG) .............................. 10202012110R

(51) Int. Cl.
*G01N 3/42*    (2006.01)
*G01N 3/06*    (2006.01)

(52) U.S. Cl.
CPC .............. *G01N 3/42* (2013.01); *G01N 3/066* (2013.01)

(58) Field of Classification Search
CPC .. G01N 3/42; G01N 3/066; G01N 2203/0003; G01N 2203/0019; G01N 2203/0075; G01N 2203/0078
See application file for complete search history.

(56) References Cited

U.S. PATENT DOCUMENTS

| | | | |
|---|---|---|---|
| 4,503,865 A | 3/1985 | Shishido | |
| 5,062,293 A * | 11/1991 | Bakirov | G21C 13/087 73/83 |
| 2011/0130682 A1 * | 6/2011 | Sakagami | A61B 5/0053 600/587 |

FOREIGN PATENT DOCUMENTS

| | | | |
|---|---|---|---|
| EP | 1251343 B1 * | 3/2006 | ............... G01N 3/42 |
| JP | 2004-077314 A | 3/2004 | |

(Continued)

OTHER PUBLICATIONS

International Patent Application No. PCT/SG2021/050738; Int'l Search Report and Written Opinion; dated Feb. 24, 2022; 8 pages.

(Continued)

*Primary Examiner* — David Z Huang
(74) *Attorney, Agent, or Firm* — BakerHostetler

(57) ABSTRACT

Disclosed is a device for measuring a property of a material. The device comprises a base; a sensor, the sensor being in a fixed coupling with the base; an indenter, the indenter being slidably coupled to the base to move relative to the base in an axial direction in response to a first abutment of the indenter with a surface of the material such that the indenter provides a push force to the sensor in the axial direction; and a locking device, the locking device being configured to releasably lock the indenter in a locked state in response to a second abutment of the base with the surface of the material, wherein the indenter in the locked state is prevented from moving relative to the base in the axial direction. Also disclosed is a new method of measuring Young's modulus of a material.

20 Claims, 17 Drawing Sheets

(VIEW A-A)

(56) References Cited

FOREIGN PATENT DOCUMENTS

| JP | 2006-329935 A | 12/2006 |
|---|---|---|
| KR | 2019-0016206 A | 2/2019 |

OTHER PUBLICATIONS

Chortos et al.; "Pursuing prosthetic electronic skin"; Nature Materials; vol. 15; Sep. 2016; p. 937-950.
Zhu et al.; "Skin-Inspired Haptic Memory Arrays with an Electrically Reconfigurable Architecture"; Advanced Materials; vol. 28; 2016; p. 1559-1566.
Jiang et al.; "Auxetic Mechanical Metamaterials to Enhance Sensitivity of Stretchable Strain Sensors"; Advanced Materials; vol. 30; 2018; 1706589; 8 pages.
Liu et al.; "Surface Strain Redistribution on Structured Microfibers to Enhance Sensitivity of Fiber-Shaped Stretchable Strain Sensors"; Advanced Materials; vol. 30; 2018; 1704229; 8 pages.
Huang et al.; "Sensitive pressure sensors based on conductive microstructured air-gap gates and two-dimensional semiconductor transistors"; Nature Electronics; vol. 3; Jan. 2020; p. 59-69.
Huang et al.; "Three-dimensional integrated stretchable electronics"; Nature Electronics; vol. 1; Aug. 2018; p. 473-480.
Rogers et al.; "Flexible Hybrid Electronics"; Advanced Materials; vol. 32; 2020; 1905590; 3 pages.
Wang et al.; "Cyber-Physiochemical Interfaces"; Advanced Materials; vol. 32; 2020; 1905522; 32 pages.
Wang et al.; "Gesture recognition using a bioinspired learning architecture that integrates visual data with somatosensory data from stretchable sensors"; Nature Electronics; vol. 3; Sep. 2020; p. 563-.
Luo et al.; "Robotic tactile perception of object properties: A review"; Mechatronics; vol. 48; 2017; p. 54-67.
Lee et al.; "A neuro-inspired artificial peripheral nervous system for scalable electronic skins"; Science Robotics; vol. 4; Jul. 2019; 15 pages.
Raspopovic et al.; "Restoring Natural Sensory Feedback in Real-Time Bidirectional Hand Prostheses"; Science Translational Medicine; vol. 6 Issue 222222ra19; Feb. 2014; 10 pages.
Yu et al.; "Skin-integrated wireless haptic interfaces for virtual and augmented reality"; Nature; vol. 575; Nov. 2019; p. 473-479.
Culbertson et al.; "Importance of Matching Physical Friction, Hardness, and Texture in Creating Realistic Haptic Virtual Surfaces"; IEEE Transactions on Haptics; vol. 10 No. 1; Jan.-Mar. 2017; p. 63-74.
Niu et al.; "A wireless body area sensor network based on stretchable passive tags"; Nature Electronics; vol. 2; Aug. 2019; p. 361-368.
Choi et al.; "Recent Advances in Flexible and Stretchable Bio-Electronic Devices Integrated with Nanomaterials"; Advanced Materials; vol. 28; 2016; p. 4203-4218.
Khan et al.; "Monitoring of Vital Signs with Flexible and Wearable Medical Devices"; Advanced Materials; vol. 28; 2016; p. 4373-4395.
Boutry et al.; "A stretchable and biodegradable strain and pressure sensor for orthopaedic application"; Nature Electronics; vol. 1; May 2018; p. 314-321.
Srinivasan et al.; "Tactual Discrimination of Softness"; Journal of Neurophysiology; vol. 73 No. 1; Jan. 1995; p. 88-101.
Mannsfeld et al.; "Highly sensitive flexible pressure sensors with microstructured rubber dielectric layers"; Nature Materials; vol. 9; Oct. 2010; p. 859-864.
Zhang et al.; "Flexible suspended gate organic thin-film transistors for ultra-sensitive pressure detection"; Nature Communications; vol. 6; 6269; 2015; 9 pages.
Schwartz et al.; "Flexible polymer transistors with high pressure sensitivity for application in electronic skin and health monitoring"; Nature Communications; vol. 4; 1859; 2013; 8 pages.
Lee et al.; "A transparent bending-insensitive pressure sensor"; Nature Nanotechnology; vol. 11; May 2016; p. 472-478.
Zhao et al.; "Optoelectronically innervated soft prosthetic hand via stretchable optical waveguides"; Science Robotics; vol. 1; eaai7529; Dec. 2016; 10 pages.
Reeder et al.; "3D, Reconfigurable, Multimodal Electronic Whiskers via Directed Air Assembly"; vol. 30; 1706733; 2018; 8 pages.
Su et al.; "Use of tactile feedback to control exploratory movements to characterize object compliance"; Frontiers in Neurorobotics; vol. 6 Article 7; Jul. 2012; 9 pages.
Dagdeviren et al.; "Conformal piezoelectric systems for clinical and experimental characterization of soft tissue biomechanics"; Nature Materials; vol. 14; Jul. 2015; p. 728-736.
Beker et al.; "A bioinspired stretchable membrane-based compliance sensor"; PNAS; vol. 117 No. 21; May 2020; p. 11314-11320.
Dhong et al.; "Role of indentation depth and contact area on human perception of softness for haptic interfaces"; Science Advances; vol. 5; Aug. 2019; 13 pages.
Hertz; "On the Contact of Elastic Solids"; Journal for die reine angew. Math.; vol. 92; 1881; p. 156-171.
K. L. Johnson; "Contact Mechanics"; Cambridge University Press; ©1985; 465 pages.
Rheinlaender et al.; "Cortical cell stiffness is independent of substrate mechanics"; Nature Materials; vol. 19; Sep. 2020; p. 1019-1025.
Cui et al.; "Seeing Down to the Bottom: Nondestructive Inspection of All-Polymer Solar Cells by Kelvin Probe Force Microscopy"; Advanced Materials Interfaces; vol. 3; 2016; 5 pages.
Gotsmann et al.; "Conservative and dissipative tip-sample interaction forces probed with dynamic AFM"; Physical Review B; vol. 60 No. 15; Oct. 1999; 11 pages.
C. Schuh; "Nanoindentation studies of materials"; Materials Today; vol. 9 No. 5; May 2006; p. 32-40.
Carrillo et al.; "Nanoindentation of polydimethylsiloxane elastomers: Effect of crosslinking, work of adhesion, and fluid environment on elastic modulus"; J. Mater. Res.; vol. 20 No. 10; Oct. 2005; p. 2820-2830.
Manduca et al.; "Magnetic resonance elastography: Non-invasive mapping of tissue Elasticity"; Medical Image Analysis; vol. 5; 2001; p. 237-254.
Timoshenko et al.; "Theory of Elasticity"; McGraw-Hill Book Company; 1951; 506 pages.
Winer et al.; A.C. Fischer-Cripps; "Nanoindentation—Mechanical Engineering Series 1"; ©2011; 279 pages.

* cited by examiner (VIEW A-A)

(VIEW B-B)

(VIEW B-B)

MODULUS SENSOR

The current application is a 371 national stage application of PCT International Application No. PCT/SG2021/050738 filed Nov. 30, 2021, and claims priority benefit of Singapore Application No. 10202012110R, filed Dec. 4, 2020, the contents of which are incorporated herein in their entireties by reference.

TECHNICAL FIELD

The present disclosure relates to the field of measurement, and more particularly to a device and method of measuring a softness-related property of a material.

BACKGROUND

Haptic perception of softness enables humans to feel the mechanical properties of objects. Artificial haptics or recreation of our sense of touch has many applications ranging from robotics, virtual and augmented reality to clinical diagnosis. Among several types of haptics, softness perception is common in our daily lives, for example, when handling soft objects like tofu or during diagnosis by medical professionals, where palpations are used for disease prognosis. Conventionally, the measurements of softness or degree of softness of a material require stabilized samples and well-cut samples with known sizes, which makes it difficult to perform in-situ measurement rapidly in many scenarios including haptics, robotics, clinics, and cosmetics.

SUMMARY

In one aspect, the present disclosure provides a device configured to measure a property of a material. The device comprises a base; a sensor, the sensor being in a fixed coupling with the base; an indenter, the indenter being slidably coupled to the base to move relative to the base in an axial direction in response to a first abutment of the indenter with a surface of the material such that the indenter provides a push force to the sensor in the axial direction; and a locking device, the locking device being configured to releasably lock the indenter in a locked state in response to a second abutment of the base with the surface of the material, wherein the indenter in the locked state is prevented from moving relative to the base in the axial direction.

Preferably, the sensor is configured to operably provide a measurement signal in response to receiving the push force. Preferably, the sensor is configured to operably provide a measurement signal concurrently with the indenter being in the locked state. Preferably, the measurement signal corresponds to a quantitative measure of the property of the material. Preferably, the measurement signal corresponds to a Young's modulus value of the material. Preferably, the measurement signal is directly correlatable to the Young's modulus value of the material. Preferably, the measurement signal corresponds to a quantitative measure of a haptic sensation of the material.

In some embodiments, the sensor comprises a strain gauge, the strain gauge having opposing edges in the fixed coupling with the base such that the strain gauge is disposed in a transverse plane in an undeformed state, the transverse plane being normal to the axial direction, and wherein the strain gauge is deformable into a deformed state by the indenter pushing against the strain gauge, the strain gauge in the deformed state being partially displaced out of the transverse plane by an offset in the axial direction. Preferably, the indenter is configured to contact the strain gauge. Preferably, the strain gauge is deformed by the indenter in the locked state to provide a strain gauge reading corresponding to a Young's modulus value of the material. Preferably, the sensor comprises a pressure sensor resiliently coupled to the indenter.

In some embodiments, the indenter comprises a first end, the first end being disposed beyond the base and configured to be brought into contact with the surface of the material; and a second end, the second end being disposed proximal to the sensor, wherein the indenter defines an indenter axis extending through the first end and the second end, and wherein the indenter axis is parallel to the axial direction when the indenter is in the locked state. Preferably, the first end is characterized by a Young's modulus value that is larger than a Young's modulus value of the material. Preferably, the first end comprises a hemispherical tip.

In some embodiments, the locking device comprises a cap, the cap being coupled to the base; and at least one clamp element, the at least one clamp element being resiliently coupled to the base, wherein the at least one clamp element is configured to be displaced by the cap in a clamping direction non-parallel to the axial direction such that the at least one clamp element releasably locks the indenter in response to the second abutment. Preferably, the locking device comprises at least two clamp elements, the at least two clamp elements being diametrically disposed about the indenter and configured to cooperatively releasably lock the indenter. Preferably, each clamp element defines a sloped surface inclined relative to the clamping plane. Preferably, each clamp element defines an increasing thickness towards the indenter. Preferably, the cap is biased apart from the base by a spacing if the indenter is in an unlocked state, and wherein the cap is responsive to a force to move relative to the base opposite the axial direction. Preferably, the cap is slidably engageable with the sloped surface such that a movement of the cap opposing the axial direction relative to the base is translated to a movement of the at least one clamp element in the clamping direction to releasably lock the indenter.

In some embodiments, the cap comprises a tab; and at least one actuating leg extending from the tab parallel and opposite to the axial direction, the at least one actuating leg being slidably engageable with the sloped surface, wherein the cap and the base are telescopically moveable to releasably lock the at least one clamp element with the indenter. Preferably, a displacement of the at least one clamp element in the clamping direction brings the at least one clamp element into an abutment with the indenter at a locking location, wherein the locking location is one selected from a continuum of potential locking locations along an indenter body of the indenter. Preferably, the indenter body defines an indenter axis extending through a first end of the indenter and a second end of the indenter, and wherein the abutment of the at least one clamp element with the indenter disposes the indenter axis to be parallel to the axial direction. Preferably, the device is configured to be attachable to an end-effector or a user.

Also disclosed is a haptic device. The haptic device comprises the device as disclosed above; and a processor coupled to the sensor and configured to acquire a measurement signal corresponding to the property of the material. Preferably, the processor is configured to determine a Young's modulus value of the material based on the measurement signal. The haptic device may further comprise a user interface coupled to the device, the user interface being configured to output a Young's modulus value of the material. The haptic device may further comprise a telemetry device coupled to the device, the telemetry device being configured to perform a method of acquiring at least one measurement signal from the sensor; and based on the at least one measurement signal, transmit a Young's modulus value and/or a trend of a plurality of Young's modulus values to a user interface and/or a computing device.

Also disclosed is a tool for quantifiable palpation. The tool comprises the device as disclosed above; an attachment, the attachment being attachable to the cap; and a user interface coupled to the device, wherein the user interface is configured to display data based on a corresponding plurality of measurement signals from the device.

In another aspect, the present disclosure includes a method of measuring a degree of softness of a material. The method comprises bringing an indenter of a device into contact with a surface of the material, wherein the indenter protrudes from a contact surface of the base, and wherein the indenter is configured to retract inwardly relative to the base such that the indenter provides a push force to the sensor in an axial direction; and obtaining a measurement signal from the sensor corresponding to a relative displacement between the indenter and the base, wherein the relative displacement is limited by the contact surface being brought into contact with the surface of the material. The method may further include: before obtaining the measurement signal, locking the indenter relative to the base in response to the contact surface contacting the surface of the material. Preferably, the measurement signal corresponds to a quantitative measure of the degree of softness of the material. Preferably, the measurement signal corresponds to the Young's modulus value of the material.

In some embodiments, the device configured to measure a property of a material, the device configured according to any described above, in which the sensor comprises a strain gauge disposed in a transverse plane in an undeformed state, the transverse plane being normal to the axial direction, wherein the strain gauge is deformable into a deformed state by the push force, wherein the strain gauge in the deformed state is partially displaced out of the transverse plane by an offset in the axial direction.

DETAILED DESCRIPTION

Figure 1A:
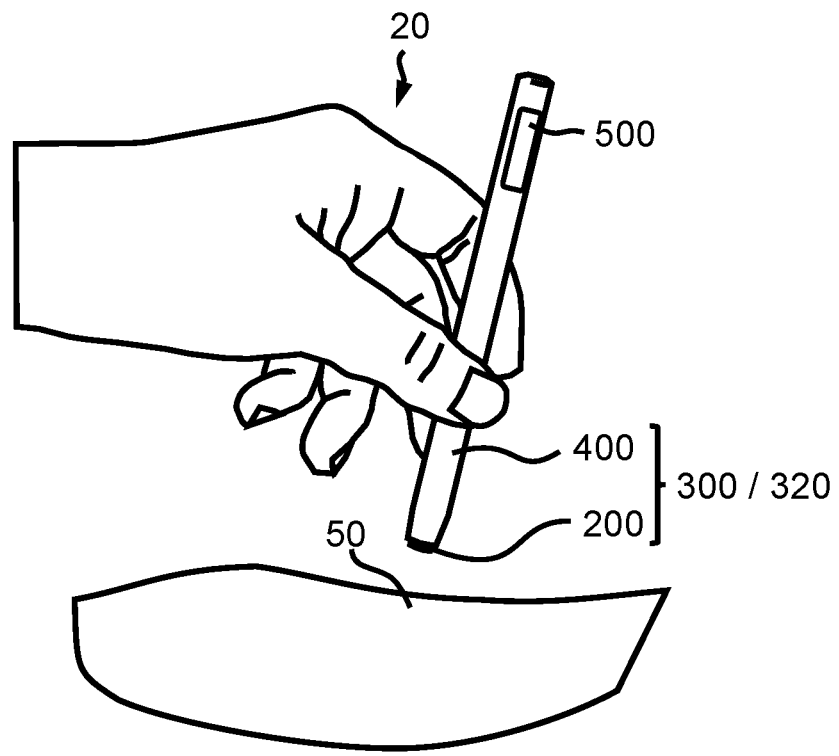
FIG. 1A illustrates a portable haptic device according to one embodiment of the present disclosure.

Reference throughout this specification to "one embodiment", "another embodiment" or "an embodiment" (or the like) means that a particular feature, structure, or characteristic described in connection with the embodiment is included in at least one embodiment. Thus, the use of "in one embodiment" or "in an embodiment" or the like in various places throughout this specification may refer to more than one embodiment. Furthermore, the described features, structures, or characteristics may be combined in any suitable manner in one or more embodiments. In the following description, numerous specific details are provided to give a thorough understanding of embodiments. One skilled in the relevant art will recognize, that the various embodiments be practiced without one or more of the specific details, or with other methods, components, materials, etc. In other instances, some or all known structures, materials, or operations may not be shown or described in detail to avoid obfuscation.

The word "exemplary" is used herein to mean "serving as an example, instance, or illustration." Any embodiment described herein as "exemplary" is not necessarily to be construed as preferred or advantageous over other embodiments. As used herein, the singular 'a' and 'an' may be construed as including the plural "one or more" unless apparent from the context to be otherwise.

Terms such as "first" and "second" are used in the description and claims only for the sake of brevity and clarity, and do not necessarily imply a priority or order, unless required by the context. The terms "about" and "approximately" as applied to a stated numeric value encompasses the exact value and a reasonable variance as will be understood by one of ordinary skill in the art, and the terms "generally" and "substantially" are to be understood in a similar manner, unless otherwise specified.

For the sake of brevity, the terms "Young's modulus", "material elasticity", "material stiffness", and "resilience of material" refer to a material property, and may be used interchangeably in the present disclosure.

Conventionally, measurement of the Young's modulus of a material requires the measurement of the full stress-strain curve, as well as knowledge of other properties of the material being tested. In addition to the bulky systems resulted from multi-parameter/multi-variable calculations involved, the requirements of stabilized and well-cut samples prevent rapid measurements in-situ and on-demand. Such conventional methods are clearly not applicable to in-situ measurement on non-standard materials such as a part of a patient's body. It will be understood that some materials are generally considered "soft" but, conventionally, "softness" has been difficult to objectively define or to quantify. The terms "haptic response", "haptic sensation", and "haptic feedback" may be interchangeably used herein to refer to a softness perception or a tactile sensation experienced by a user. For example, such softness perception may be a softness of an object when the user touches the object. This softness perception is conventionally only perceivable by the user's finger, in which mechanoreceptors in the user's skin, muscles, tendons, and joints generate neural signals in response to the pressure on the finger. The softness perception is thus conventionally understood to be a subjective feeling or sensation. The following describes a new method of measuring a Young's modulus of a material, including but not limited to soft materials. According to embodiments of the present disclosure, non-limiting examples of a device and a method of measuring a softness-related property (here generally referred to as "softness") of a material are described below to illustrate haptic sensation or haptic feedback in the form of a single quantitative measure such as a Young's modulus value of the material. The device and method are applicable to soft materials, including but not limited to materials having a Young's modulus value from several tens of kPa to a few MPa.

The term "palpation" refers to a clinical diagnostic method involving a trained medical personnel using fingers or hands to touch the patient and to feel for swelling, turgidity, hard lumps under the skin, softness of human body/muscle/tissue, etc. Conventionally, the amount of palpation force exerted on a target area varies from one touch to another, and it takes a trained and experienced medical professional to exert a consistent palpation in order to correct diagnose the patient's condition. Measurement of the softness of a material can serve as the basis for a wide range of applications, including but not limited to, palpation (such as for clinical diagnosis), massage tools (such as for physiotherapy or cosmetic purposes), haptic sensitive tools (such as for surgical instruments, application of medications and/or creams for medical or cosmetic purposes), monitoring conditions such as elasticity of skin (for medical or cosmetic purposes), tools for product quality assessment, classification and/or quality control (such as for checking ripeness of fruits), etc. The term "measure" as used herein is to be understood broadly and not to limit the potential applications that may be enabled by measuring a softness-related property of a material (e.g., of an object or a subject).

FIG. 1A illustrates a modulus sensor 200 (interchangeably referred to as a device 200) according to one embodiment of the present disclosure. The modulus sensor or device 200 is useful in a variety of applications, including but not limited to providing a quantitative measure corresponding to the Young's modulus of a material. The device 200 is optionally coupled to a handle/attachment 400 to form a hand-held or portable haptic device 300. The device 200 is configured to be operable by a user 20 bringing the device 200 into contact with a surface 50 of a material or a target to be sensed for its softness and/or to palpate the target area. A telemetry device 320 may be provided in the haptic device 300. The haptic device 300 may be configured to communicate by a cable or wirelessly (as shown) with a computing device (not shown) such that measurement signals obtained by the device 200 may be stored, displayed, and/or used. The haptic device 300 may be configured as a tool for quantifiable palpation, such as one suitable for use by a medical professional. A user interface, such as a display 500, may be provided on the attachment 400 to provide real-time and/or essentially instantaneous indication or readings based on the measurement signals obtained from the device 200. As will be described in the following, the device 200 is configured to provide a more consistent and quantifiable palpation, and hence a more accurate clinical diagnosis. The haptic device 300 is also configured to provide real-time measurements such that the haptic device can serve as a practical tool for bedside clinical diagnosis.

Figure 1B:
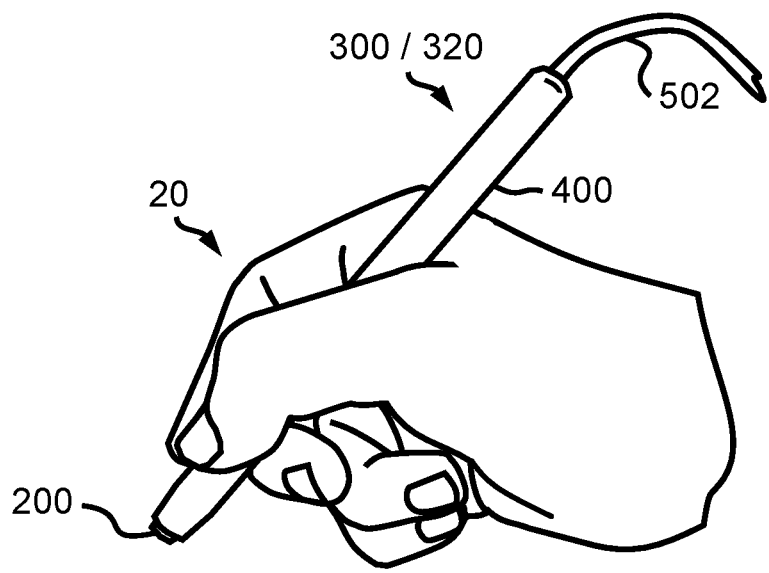
FIG. 1B illustrates a haptic device according to another embodiment of the present disclosure.

FIG. 1B illustrates another embodiment of the haptic device 300 including the device 200 configured for use to measure softness and/or provide palpation, etc. The device 200 may be coupled with an attachment 400 that serves as a handle for a user 20 as well as to house a telemetry device 320. The haptic device 300 may be configured to communicate wirelessly or by a cable 502 (as shown) with a computing device (not shown) such that measurement signals obtained by the device 200 may be stored, displayed, and/or used.

The device 200 advantageously enable the haptic device 300 to be held by hand in different poses in the course of use. For example, the haptic device 300 may be held, e.g., be used while held in various different poses. For example, the haptic device 300 may be held like a brush (FIG. 1A) or like a pen (FIG. 1B). As will be described in the following, the device 200 is configured such that it can self-correct to provide a meaningful measurement signal even if the haptic device 300 and the surface 50 are not strictly orthogonally aligned. This enables the haptic device 300 to be hand-held and portable, and suitable for use in bedside clinical diagnosis.

Figure 1C:
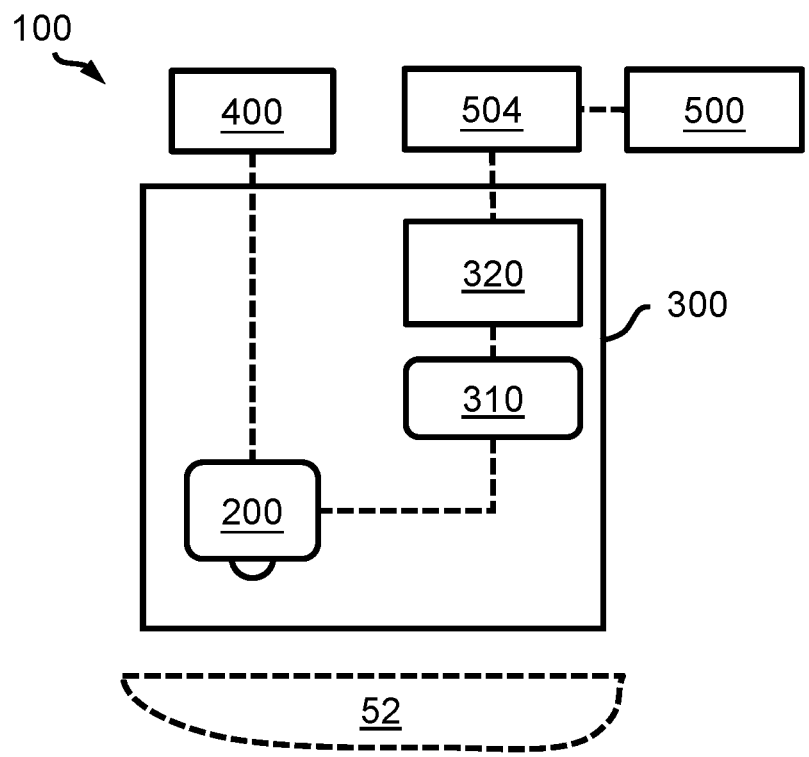
FIG. 1C is a schematic diagram of a haptic device according to another embodiment of the present disclosure.

FIG. 1C is a schematic block diagram of a system 100 according to another embodiment of the present disclosure. The system 100 includes a haptic device 300. The haptic device 300 includes the device 200 operably coupled to a processor 310. The processor 310 may be configured to acquire from the device 200 a measurement signal corresponding to the property of the material. In some embodiments, the processor 310 is configured to determine a Young's modulus value of the material based on the measurement signal. The haptic device 300 may further include a telemetry device 320. In some embodiments, the telemetry device 320 is configured to acquire at least one measurement signal from the device 200; and based on the at least one measurement signal, transmit a Young's modulus value and/or a trend of a plurality of Young's modulus values to a computing device 504 for records, calculations, display, and/or other uses. The computing device 504 may be provided with a user interface 500 configured to display measurement data and/or diagnostic information. In this example, the haptic device 300 may be coupled to a detachable or interchangeable attachment 400. In some examples, the computing device 504 may be a mobile electronic device, such as a smart phone, etc. In some embodiments, the attachment 400 may be an end-effector. In other examples, the attachment may be wearable by a user. In some examples, the haptic device 300 may be configured as a laboratory equipment to measure softness perception of objects/subjects 52.

Figure 2:
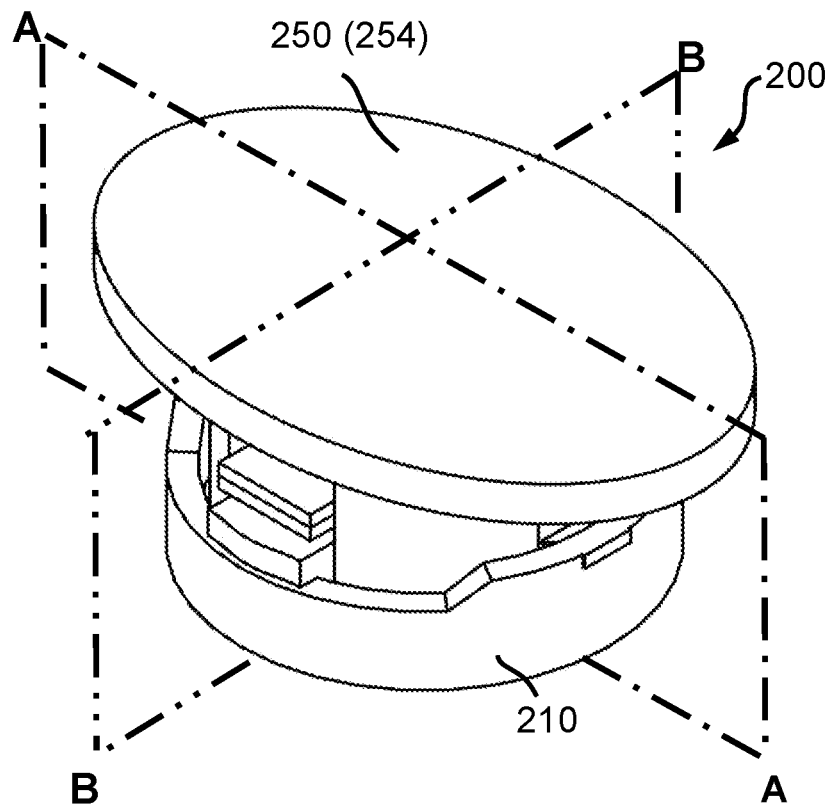
FIG. 2 is an isometric view of a device according to an embodiment of the present disclosure.
Figure 3A:
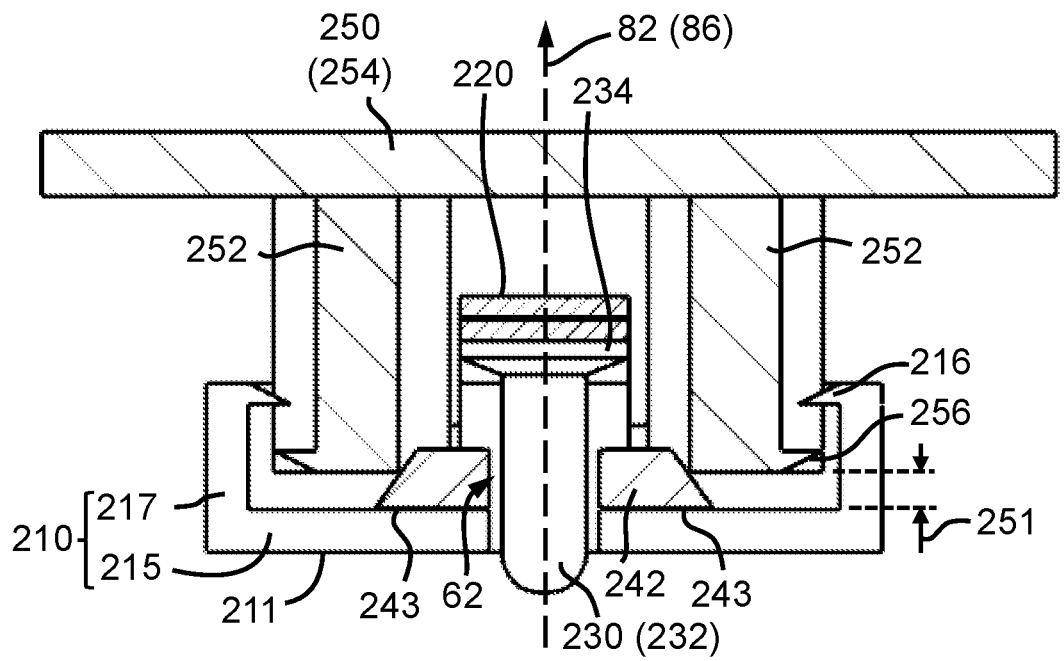
FIGS. 3A and 3B are cross-sectional views of the device of FIG. 2 along section A-A and section B-B respectively.
Figure 3B:
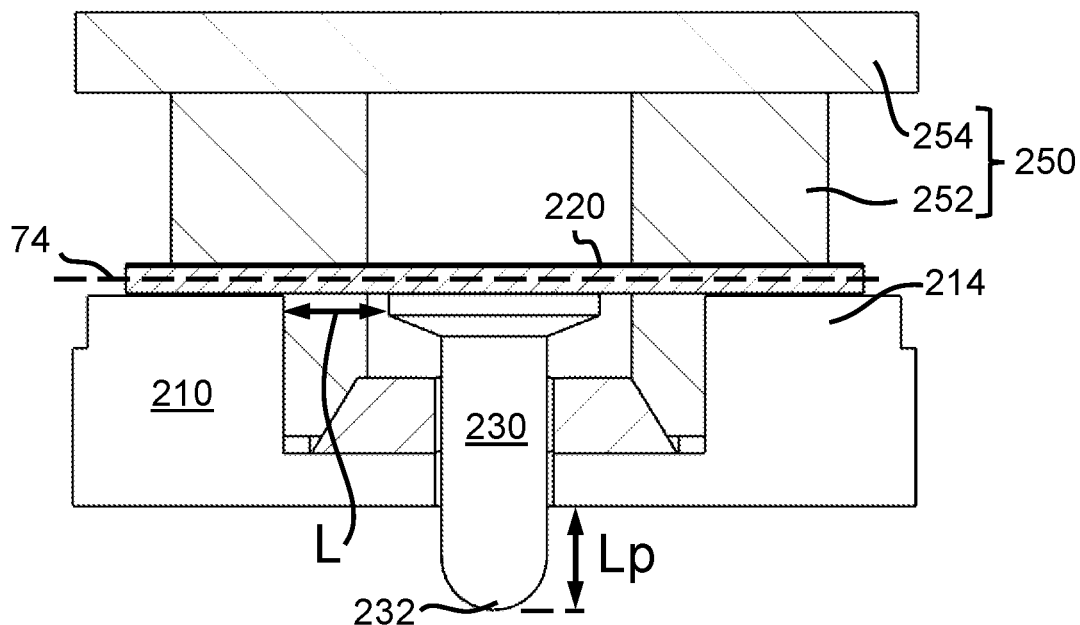
Figure 4:
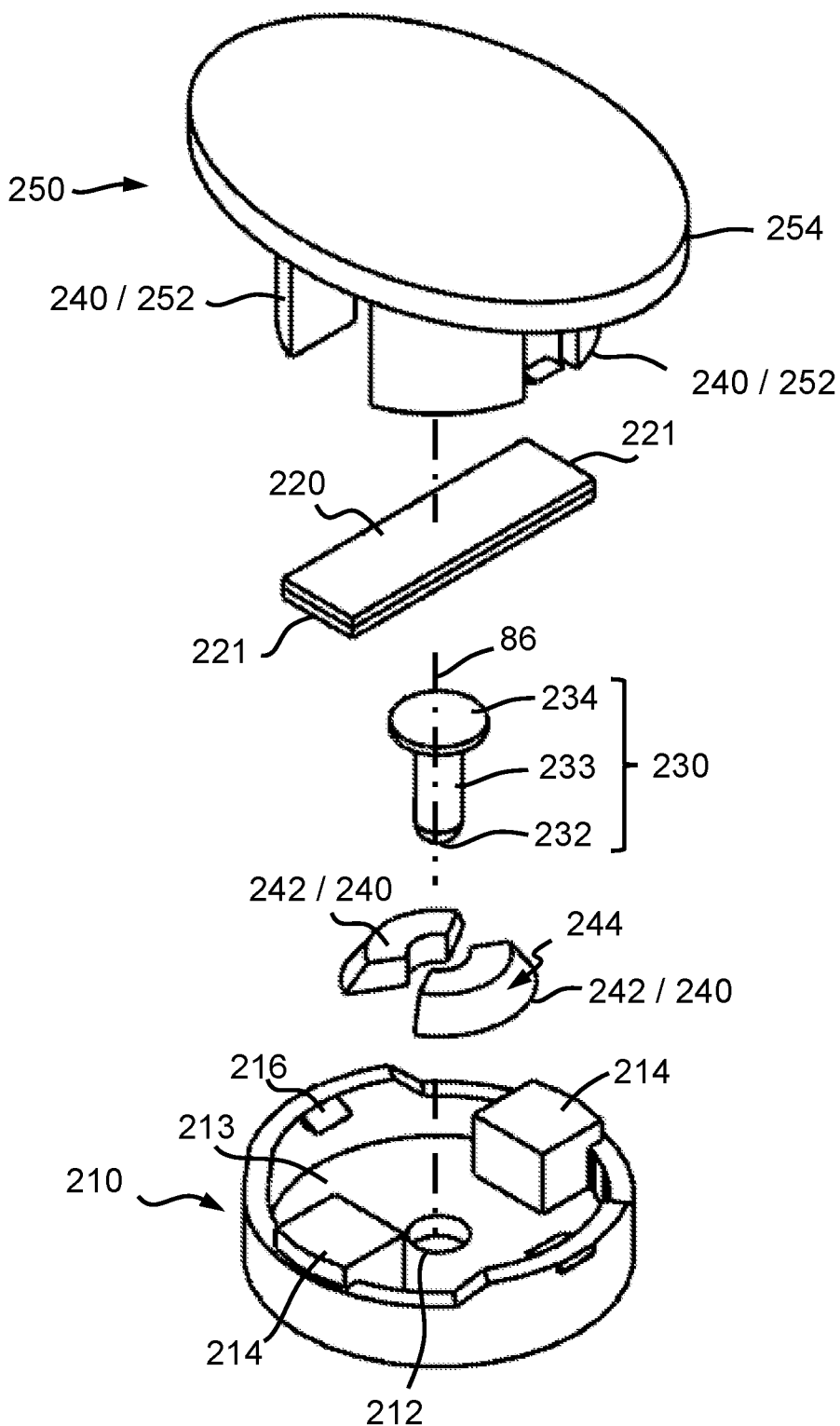
FIG. 4 is an exploded view of the device of FIG. 2.

FIGS. 2 to 4 illustrate a non-limiting embodiment of the device 200 to aid understanding. FIG. 2 shows a base 210 coupled with a cap 250. The cap 250 may be configured with a tab 254 and actuating legs 252. In some embodiments, the cap 250 may include a tab 254 and at least one actuating leg 252 extending from the tab 254 parallel to and opposite to an axial direction 82. In this example, the actuating legs 252 are provided with flanges 256. The device 200 may be coupled with an attachment 400 via the tab 254 of the cap 250. In some examples, tab 254 may be formed as an integral part of the attachment 400. The tab 254 may be configured in different forms to suit the application and/or ergonomics. For example, in the pen configuration of FIG. 1A or FIG. 1B, the body of the pen (the handle/attachment 400) can also serve as the tab 254.

As shown in FIGS. 3A, 3B, and 4, the base 210 includes a contact end 215 with an opening 212 defined by the contact end 215. The contact end 215 provides an external face 211 and an opposing internal face 213. A wall 217 extends from the contact end 215 along the axial direction 82. The wall 217 may be configured with a set of pothooks 216 which are releasably engageable with the actuating legs 252. The cap 250 and the base 210 are prevented from being axially pulled apart from one another by the cooperative engagement of flanges 256 and the pothooks 216.

In some embodiments, the device 200 includes a locking device 240 having at least one clamp element 242. One or more clamp elements 242 may be provided in the device 200. In some examples, one of the clamp elements 242 is displaceable relative to the indenter 230, while other of the clamp elements 242 are fixed relative to the indenter 230. In this example, two clamp elements 242 are disposed on the internal face 213. The clamp elements 242 may be diametrically disposed about the indenter 230 and configured to cooperatively and releasably lock the indenter 230. Both of the clamp elements 242 are configured to be displaceable relative to the indenter 230 to lock the indenter 230. The actuating legs 252 rest on the respective clamp elements 242 such that the cap 250 and the base 210 are biased to be axially spaced apart. In some examples, at least one of the clamp elements 242 are resiliently coupled to the base 210 and moveable relative to the opening 212. In some examples, a layer of polymer is provided between each of a pair of the clamp elements 242 and the internal face 213 of the base 210. The layer of polymer serves as an elastic adhesive providing a resilient/elastic coupling between the clamp elements 242 and the base 210. In some examples, the device 200 is formed by 3D printing using a support material such as FullCure 705. A layer 243 of FullCure 705 of about 200 μm thickness may be retained after the 3D printing process, between the base 210 and the clamp elements 242. The FullCure 705 layer 243 can serve as an elastic/resilient coupling between each of the clamp elements 242 and the internal face 213 of the base 210. In other examples, a resilient member in the form of a spring may be coupled between at least one clamp element 242 and the base 210. The resilient coupling between each clamp element 242 and the base 210 is configured to bias the clamp element 242 away from the opening 212, while permitting a relative movement of the clamp element 242 toward the opening 212.

Each of the clamp elements 242 may define a sloped surface 244 inclined relative to a clamping plane 76. The sloped surface 244 may be one of or a combination of a straight/flat surface, a concave surface, or a convex surface. Each clamp element 242 may define an increasing thickness towards the indenter 230. In some embodiments, each clamp element 242 may define a sloped surface 244 with an increasing height toward the indenter 230 and relative to the clamping plane 76, with or without an increasing thickness. For example, the clamp element 242 may be configured as a hollow element with a relatively constant thickness throughout, while still presenting a sloped surface 244 as described. The clamping plane 76 may be parallel to the transverse plane 74.

The actuating legs 252 extending from the tab 254 are disposed substantially parallel to the axial direction 82. At least one actuating leg 252 may be slidably engageable with the sloped surface 244 of the respective clamp elements 242. The cap and the base are telescopically moveable 88 to releasably lock the at least one clamp element 242 with the indenter 230. A movement of the cap 250 may push onto sloped surface 244 of the clamp elements 242, to displace the clamp elements to move towards the indenter 230. Therefore, the cap 250 is slidably engageable with the sloped surface 244 such that a movement of the cap 250 opposing the axial direction 82 relative to the base 210 is translated to a movement to each of the clamp element 242 in the clamping direction 84 to releasably lock the indenter 230. A displacement of one or more of the clamp elements 242 in the clamping direction 84 brings the clamp elements 242 into an abutment with the indenter 230 at a locking location. The locking location may be one selected from a continuum of potential locking locations along the indenter body 233 of the indenter 230. In some embodiments, the abutment of respective clamp elements 242 with the indenter disposes the indenter axis 86 to be parallel to the axial direction 82. In other words, the clamp elements 242 clamps onto the indenter 230 to align the indenter axis 86 parallel to the axial direction 82. This advantageously prevents the indenter 230 from being in a tilted orientation relative to the base 210 or the surface 50.

A sensor 220 is disposed in a cavity defined by the cap 250 and the base 210. The sensor 220 is configured to be in a fixed coupling 227 with the base 210, that is, at least a part of the sensor 220 is coupled to be immovable relative to the base 210. In some examples, the sensor 220 may include a strain gauge, such as a polydimethylsiloxane (PDMS) based piezoresistive strain sensor. The strain gauge may be a multilayer structure. Opposing ends 221 of the strain gauge are fixedly coupled 227 to respective supports 214 of the base 210 such that the strain gauge is substantially disposed in a transverse plane 74 when the strain gauge is in an undeformed state. The transverse plane 74 is configured to be substantially normal to the axial direction 82.

The device 200 includes an indenter 230 slidably coupled to the base 210. In this example, the indenter 230 is slidable through the opening 212 defined by the contact end 215 of the base 210. The indenter 230 is configured to move relative to the base 210 in the axial direction 82. The indenter 230 may be configured with an indenter body 233 that defines an indenter axis 86 extending through a first end 232 and a second end 234.

The indenter 230 is disposed relative to the base 210 such that the first end 232 extends outside the device 200, i.e., with the first end 232 disposed beyond the base 210. In use, device 200 is brought towards a surface 50 of a material/object to be tested such that the first end 232 of the indenter 230 can be brought into contact with the surface 50. The first end 232 of the indenter 230 may be shaped with a rounded tip or a substantially hemispherical tip. Preferably, the first end 232 is made of a relatively hard material characterized by a Young's modulus (e.g., in a range of more than 1 GPa) that is significantly larger than a Young's modulus of the material/object to be tested (e.g., in a range of less than 1 MPa).

The second end 234 of the indenter 230 is disposed proximal to the sensor 220. In this example where the sensor 220 includes a strain gauge, the indenter 230 and the sensor 220 are disposed such that the second end 234 of the indenter 230 can come into contact with a part of the strain gauge that is deformable as a result of the second end 234 pushing on the strain gauge.

Figure 5:
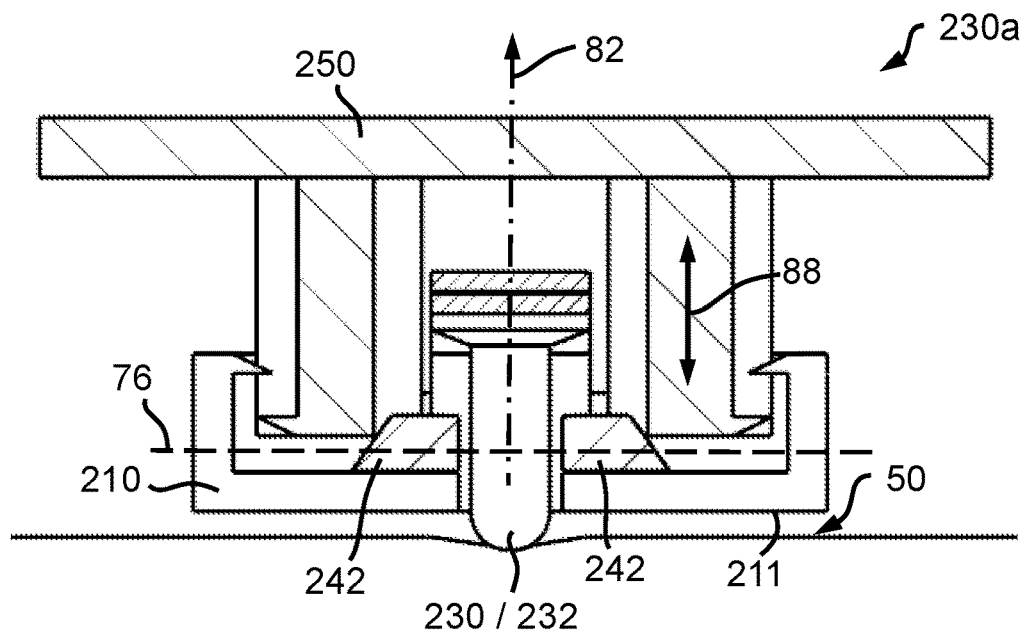
FIG. 5 is a cross-sectional view of the device of FIG. 2 in an unlocked state.
Figure 6:
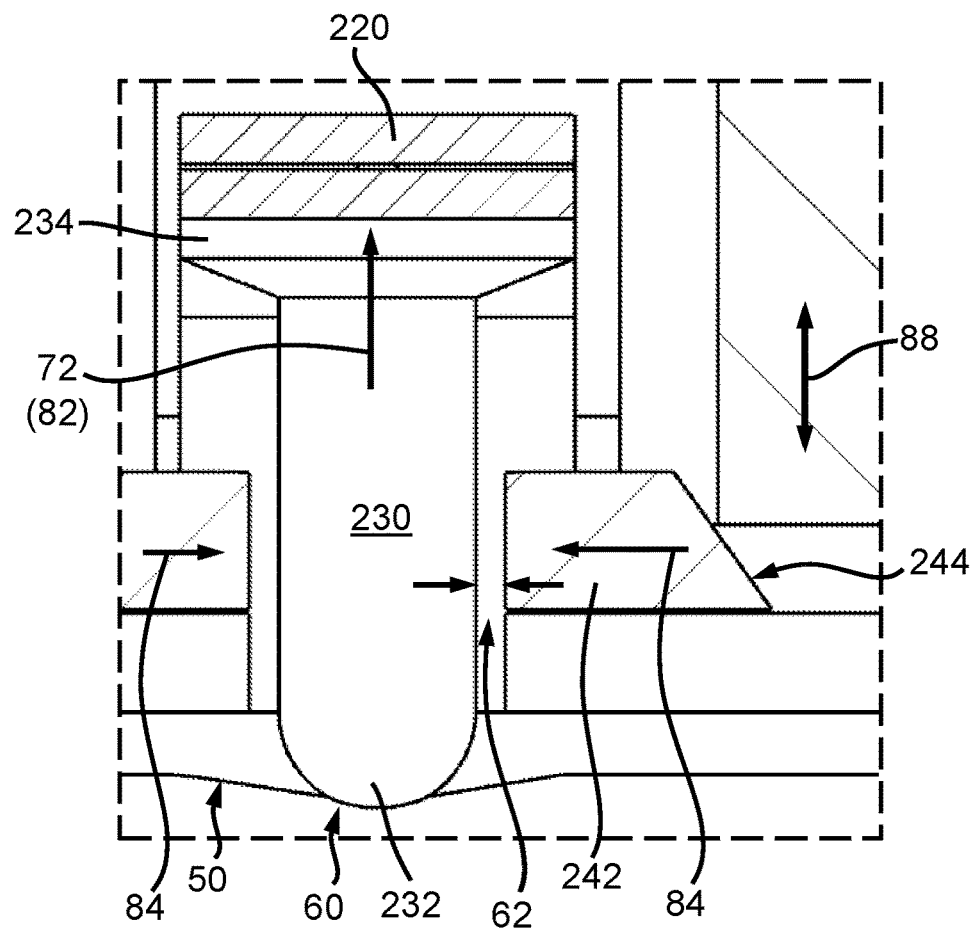
FIG. 6 is a partial magnified view of FIG. 5.
Figure 7:
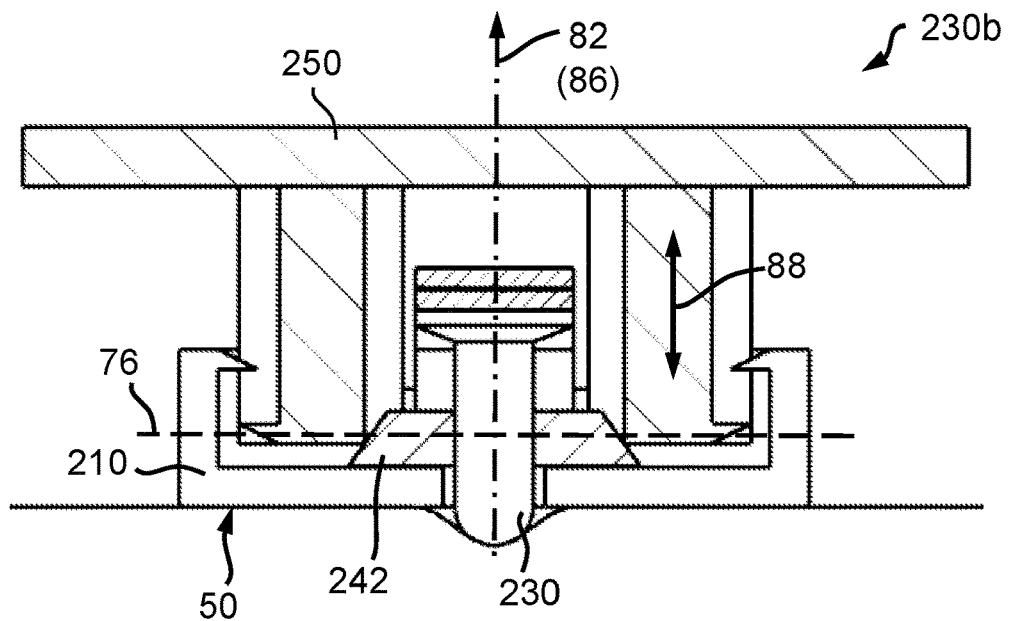
FIG. 7 is a cross-sectional view of the device of FIG. 2 in a locked state.
Figure 8:
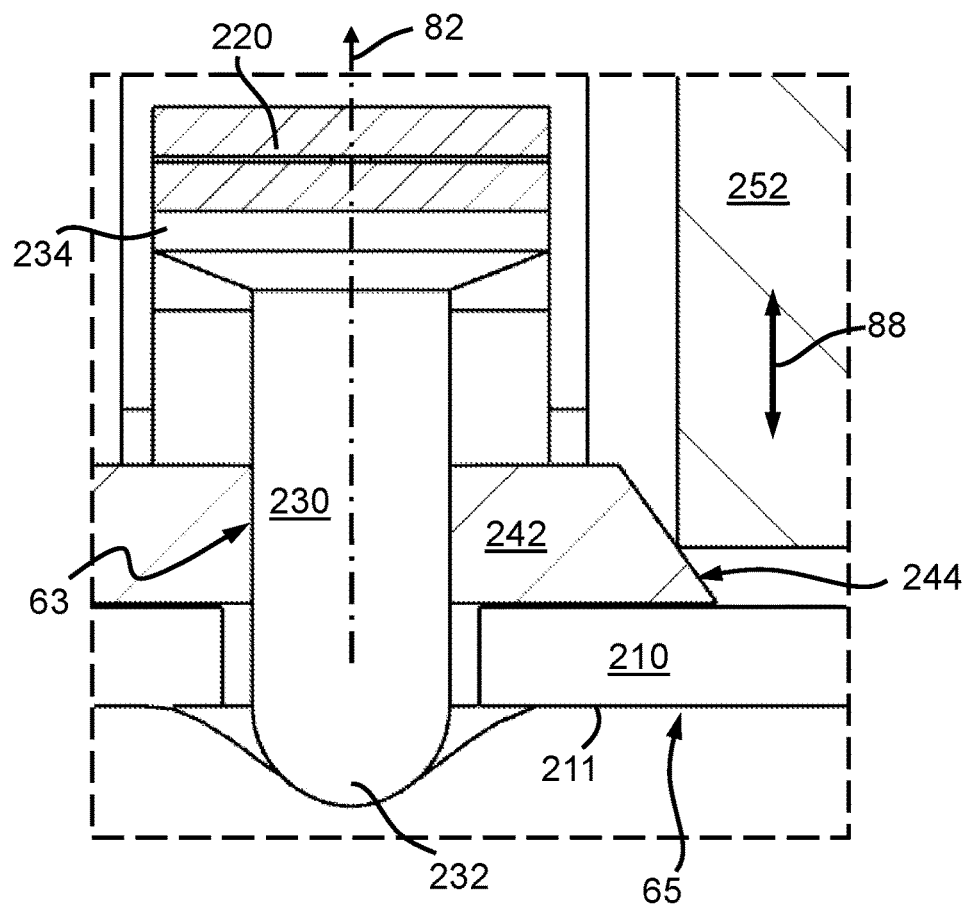
FIG. 8 is a partial magnified view of FIG. 7.
Figure 9:
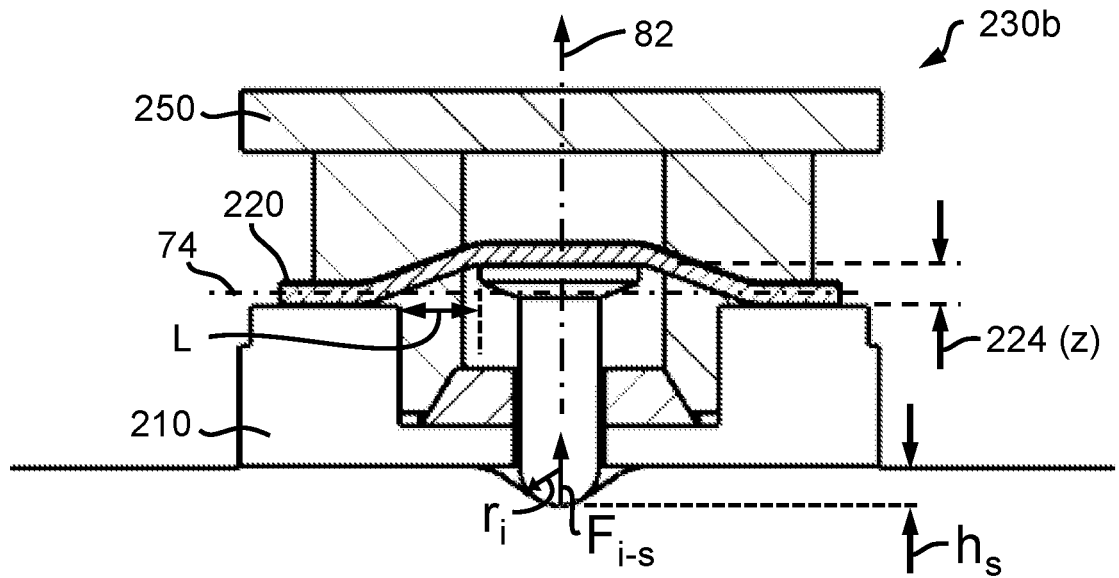
FIG. 9 is a cross-sectional view of the device of FIG. 2 along section B-B.

Reference will be made to FIGS. 5 to 10 to describe the device 200 in operation or in use. FIG. 5 illustrates a cross-sectional view of the device 200 when it is brought into contact with a surface 50, and FIG. 6 is a magnified partial view of FIG. 5. Initially, the first end 232 of the indenter 230 contacts the surface 50 and the external face 211 of the base 210 does not contact the surface 50. As illustrated, the indenter 230 is configured such that in response to a first abutment 60 in which the indenter 230 abuts a surface 50 of the material, the indenter 230 pushed along the axial direction 82. When the indenter 230 contacts the sensor 220, the indenter 230 provides a push force 72 to the sensor 220. In some embodiments, the strain gauge of the sensor 220 is deformable into a deformed state (as shown in FIG. 9) by the indenter 230 pushing against the strain gauge. The strain gauge in the deformed state is partially displaced out of the transverse plane 74 by an offset 224 in the axial direction 82. The push force 72 may be in the axial direction 82. Alternatively, the push force 72 may be substantially parallel to the axial direction 82. The sensor 220 is configured to operably provide a measurement signal in response to receiving the push force 72. The indenter body 233 and the opening 212 are sized such that the indenter 230 is freely slidable through the opening 212. A clearance 62 is provided between the indenter 230 and the respective clamp element 242, such that the locking device 240 is not engaged with the indenter. The indenter 230 is in an unlocked state 230a and is slidable relative to the base 210. The cap 250 may be biased apart from the base 213 by a spacing 21 when the indenter 230 is in the unlocked state 230a, such that the cap 250 is responsive to the pressing force to move relative to the base 210 opposite the axial direction 82.

FIG. 7 illustrates the device 200 when the indenter 230 is retracted (at least partially retracted) into the device 200 with the first end 232 indenting the surface 50 and the external face 211 of the base 210 contacting the surface 50. The base 210 is in a second abutment 65 with the surface 50, or more specifically, the external face 211 of the base 210 abuts the surface 50. The device 200 is configured such that upon a second abutment of the base 210 with the surface 50, the indenter 230 is locked and prevented from further displacement relative to the base 210. At least one of the clamp elements 242 are configured to be displaced by the cap 250 in a clamping direction 84, closing the clearance 62, such that the clamp elements 242 releasably lock the indenter 230 in response to the second abutment 65. The clamping direction 84 may be in a radial direction towards the indenter 230, and is non-parallel to the axial direction 82.

This automatic locking advantageously makes the device 200 easy to use and yet robust enough to provide consistent and meaningful measurements. The user may apply the device 200 to the surface 50 without a need to carefully regulate the amount of force applied (via the cap 250 and hence via the device 200) to the surface. Referring also to FIG. 8 which shows a magnified partial view of FIG. 7, when base 210 is in the second abutment with the surface 50, any further pressing of the cap 250 opposite the axial direction (e.g., when a pressing force is provided on the cap 250 by a fingertip), the actuating legs 252 in slidable engagement with the respective sloped surfaces 244 will squeeze the clamp elements 242 toward the indenter 230 until there is a releasable engagement or releasable locking 63 between the indenter 230 by the clamp element 242 of the locking device 240. In the locked state 230b, there is no clearance 62 between the indenter and the clamp element 242, and the indenter axis is aligned with the axial direction 82. The locking device 240 releasably locks the indenter 230 in a locked state 230b (as shown in FIGS. 7 to 9), in response to a second abutment 65 where the base 210 abuts with the surface 50. The indenter 230 in the locked state 230b is prevented from further movement relative to the base 210 in the axial direction 82.

FIG. 9 shows that the second end 234 of the indenter 230 pushes against the sensor 220 (in this example, a strain gauge). The strain gauge in the deformed state is partially displaced out of the transverse plane 74 by an offset 224 in the axial direction 82. A push force from the indenter 230 bears on the sensor 220 to give a measurement signal which corresponds to a quantitative measure of the property of the material. As an example, the measurement signal corresponds to a Young's modulus value of the material. The clamp elements 242 are forced into a tight grip on the indenter body 233, which concurrently and automatically brings the indenter axis 86 into substantially co-axial alignment with the axial direction 82. In some embodiments, the lock device 240 disposes the indenter axis 86 parallel to the axial direction 82 when the indenter 230 is in the locked state 230b. In some embodiments, the strain gauge is deformed by the indenter 230 in the locked state 230b to provide a strain gauge reading corresponding to a Young's modulus value of the material. The deformation of the sensor 220 and hence the measurement signal provided by the sensor 220 can be held constant or substantially constant when the indenter 230 is in the locked state 230b. The user need not be very careful to manually check and adjust for alignment as the device 200 is configured to ensure the alignment and consistent measurements. The self-alignment of the device 200 is also of practical use in clinical diagnosis where it is often impossible to orientate the patient's body such that the surface to be tested is perfectly horizontal.

Figure 10:
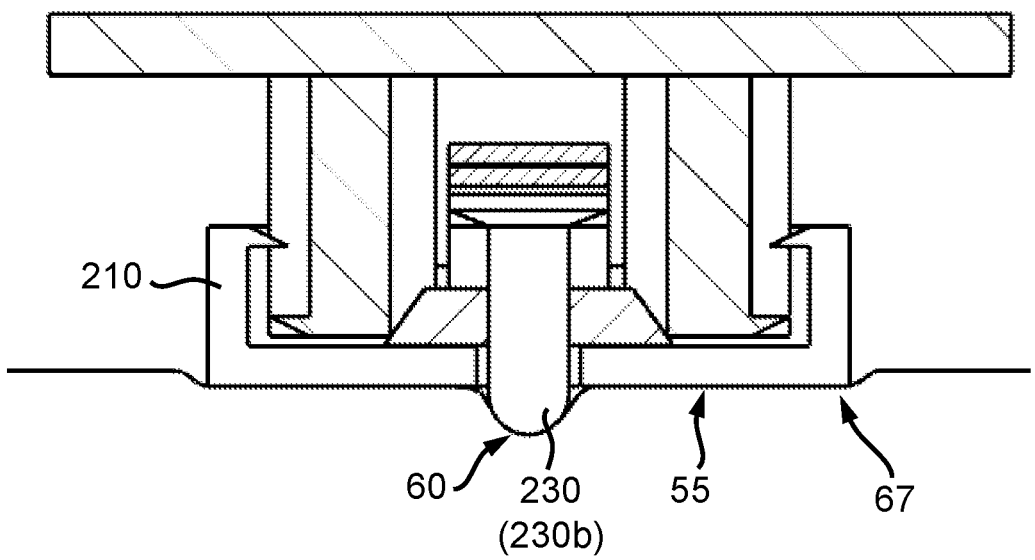
FIG. 10 is a cross-sectional view of the device of FIG. 2 in a locked state.

FIG. 10 illustrates an example where the device 200 is further brought towards the surface 50 of the material to form a third abutment 67, in which the base 210 depresses or deforms a surface 55. This may be the case where the user presses on the device 200 with any pressing forces (even if the user intends to use only a gentle touch). The actuating legs 252 are prevented by the clamp elements 240 from moving further opposite the axial direction 82. The sloped surface 244 of a clamp element 240 also result in a stronger locking/clamping force between the clamp element 240 and the indenter 230 if the user continues to press on the device 200. The locking device 240 locks the indenter 230 in the locked state 230b, and the indenter 230 does not further deform the strain gauge. Any depression of the device 200 into the soft material will not change in measurement signal from the strain gauge. The user may consistently obtain useful softness perception by using the device 200, without a need to carefully regulate the amount of pressing forces applied and without a need to carefully ensure correct orientation of the device relative to the surface.

Figure 11:
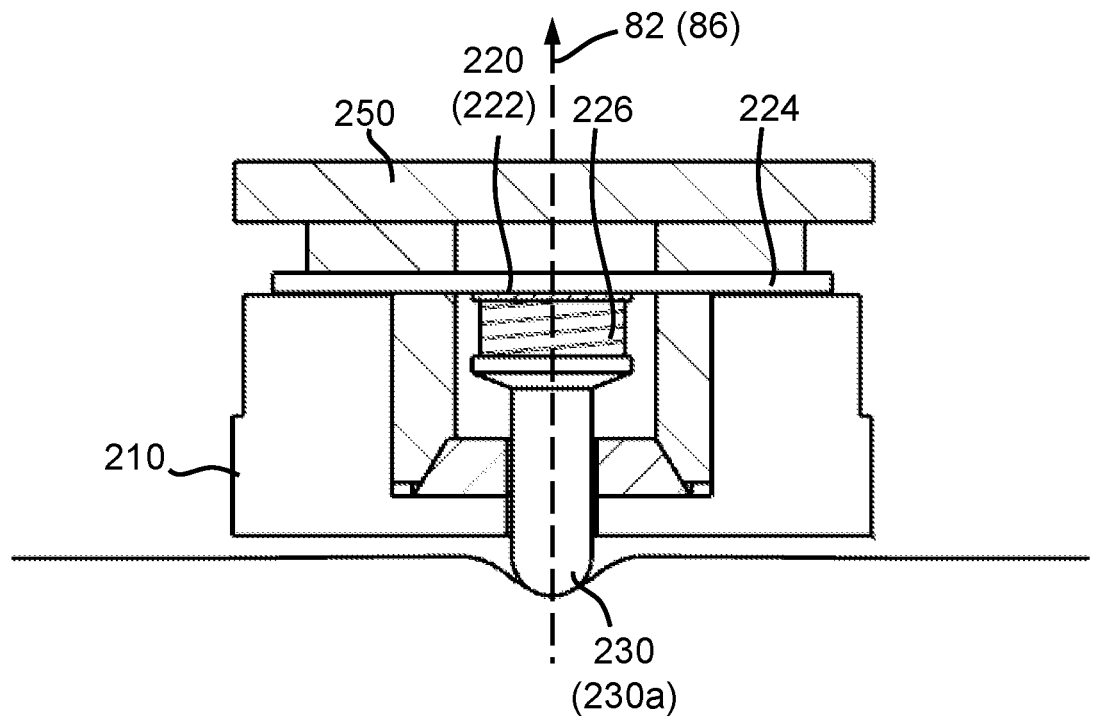
FIG. 11 is a cross-sectional view of a device according to another embodiment.
Figure 12:
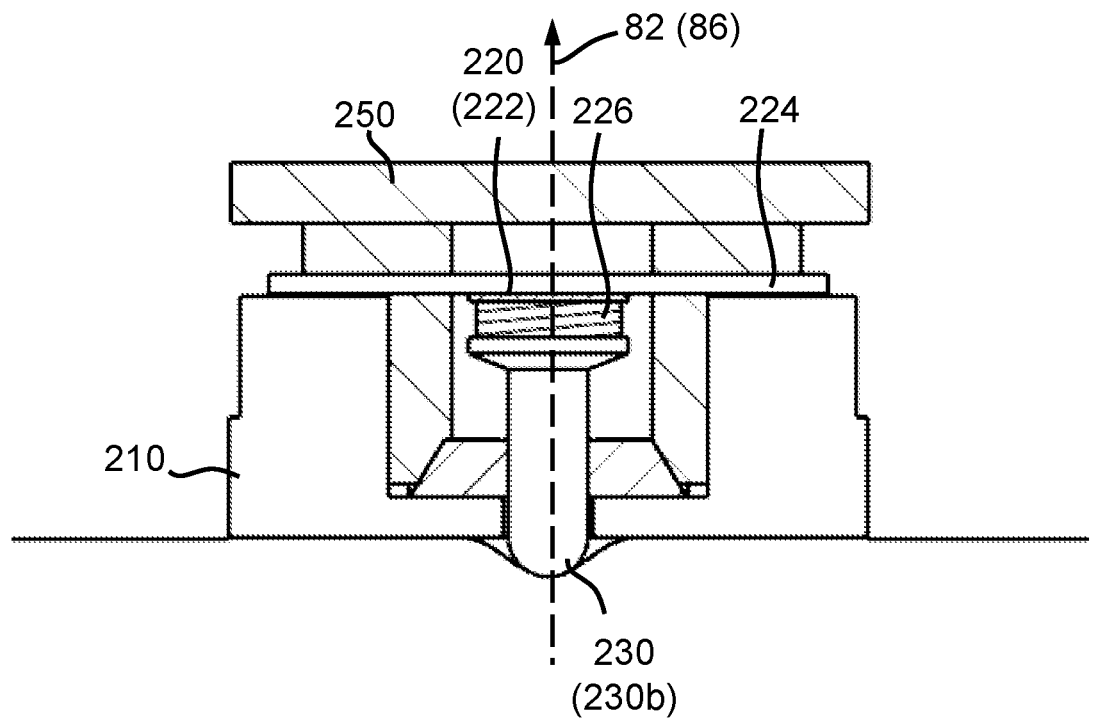
FIG. 12 is another view of a device of FIG. 11.

An alternative embodiment is shown in FIGS. 11 and 12. The sensor 220 includes a pressure sensor 222 resiliently coupled to an indenter 230. For example, the pressure sensor 222 may be coupled between a rigid plate 224 and a resilient member 226. The rigid plate 224 may be fixedly coupled to the base 210. The resilient member 226 may be configured to resiliently deform along the axial direction 82. When the indenter 230 moves in the axial direction 82 from an unlocked state 230a (as shown in FIG. 11) to a locked state 230b as shown in FIG. 12), the resilient member 226 is deformed and a push force from the indenter 230 bears on the pressure sensor 222 to give a measurement signal which corresponds to a quantitative measure of the property of the material. As an example, the measurement signal corresponds to a Young's modulus value of the material.

Figure 13:
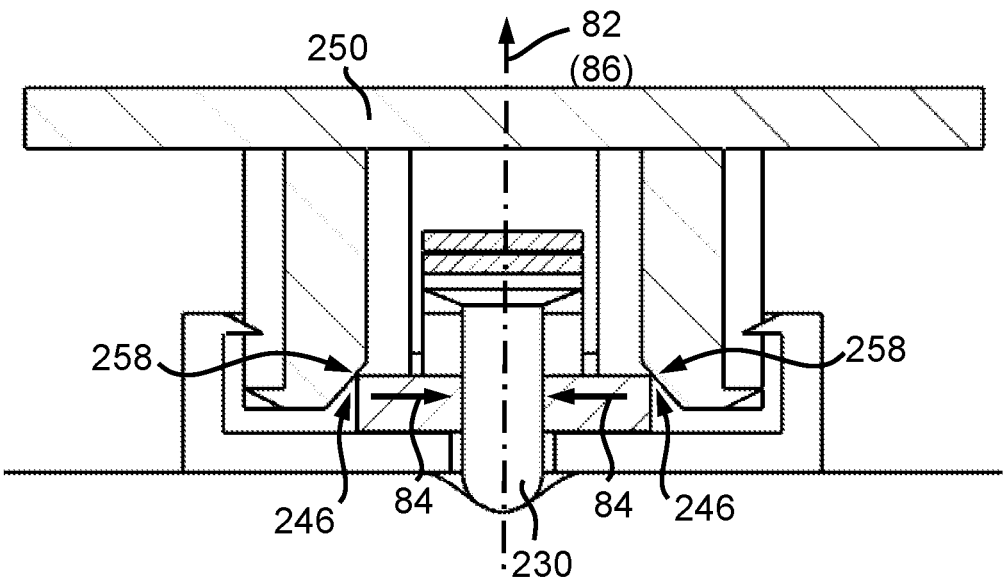
FIG. 13 is a cross-sectional view of a device according to another embodiment.

In other embodiments as illustrated in FIG. 13, one or both of the actuating legs 252 may define slopped surface 258 slidably engageable with a corner 246 of respective clamp elements 242. Similarly, a movement of the cap 250 opposing the axial direction 82 relative to the base 210 is translated to a movement to each of the clamp element 242 in the clamping direction 84 to releasably lock the indenter 230.

Figure 14:
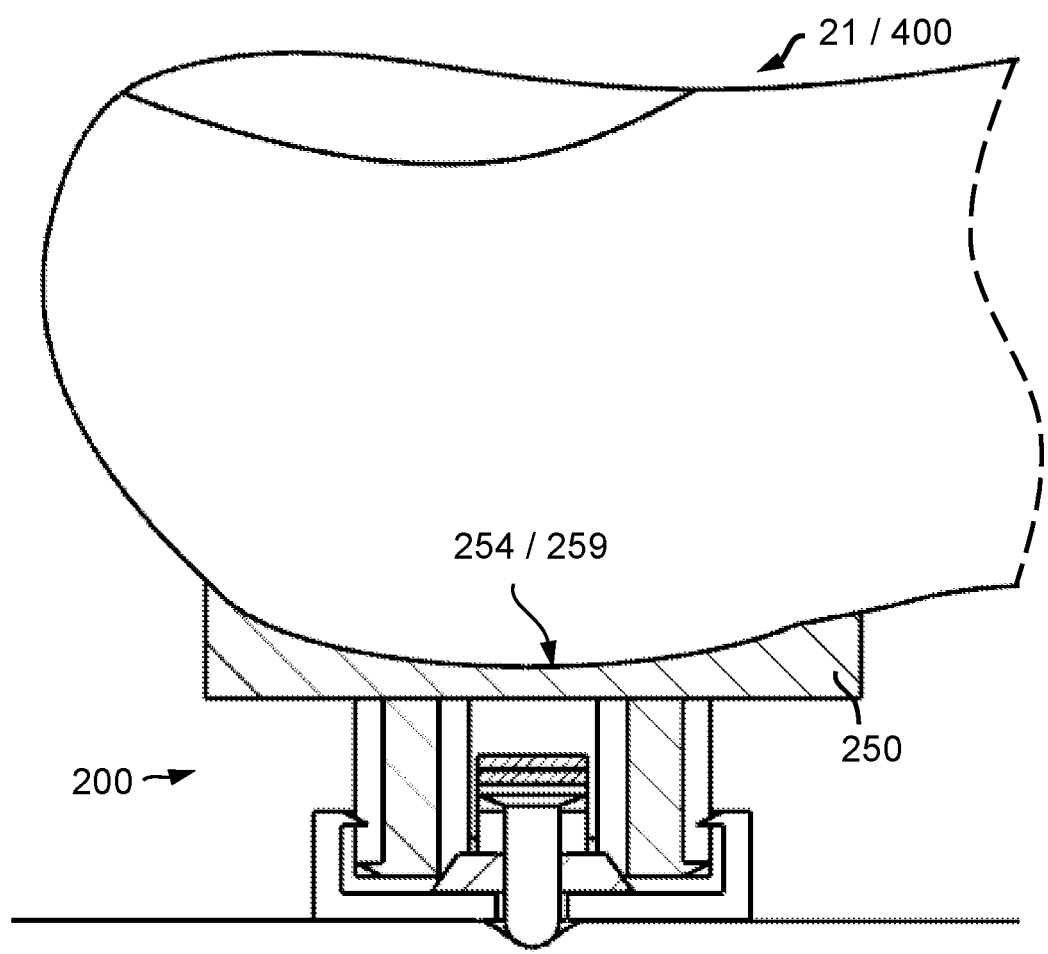
FIG. 14 shows the device of FIG. 2 positioned for use in relation to a fingertip.

The device 200 is useful in many applications including robotics, prosthetics, and clinical diagnosis. FIG. 14 (not drawn to scale) shows an example of how the device 200 may be positioned in relation to a fingertip 21 of a user, an artificial finger, or an end-effector of a robot. The device 200 may be releasably attachable or fixed to the fingertip 21 via the cap 250. In this example, the fingertip is positioned at a top surface 259 of the tab 254. The cap 250 may be configured with a curved top surface 259 in compliance with a curvature of the fingertip. In another example, the cap 250 may be coupled to an attachment 400, such as a finger glove or a prosthetic. In the course of the user/end-effector performing various activities, the device 200 may serve as a haptic sensor, generating electrical signals in which each single electrical signal (measurement signal) can be transformed or correlated to a haptic perception of softness. The device 200 can be used to heighten or provide touch sensory perception to the user/robot.

Figure 15:
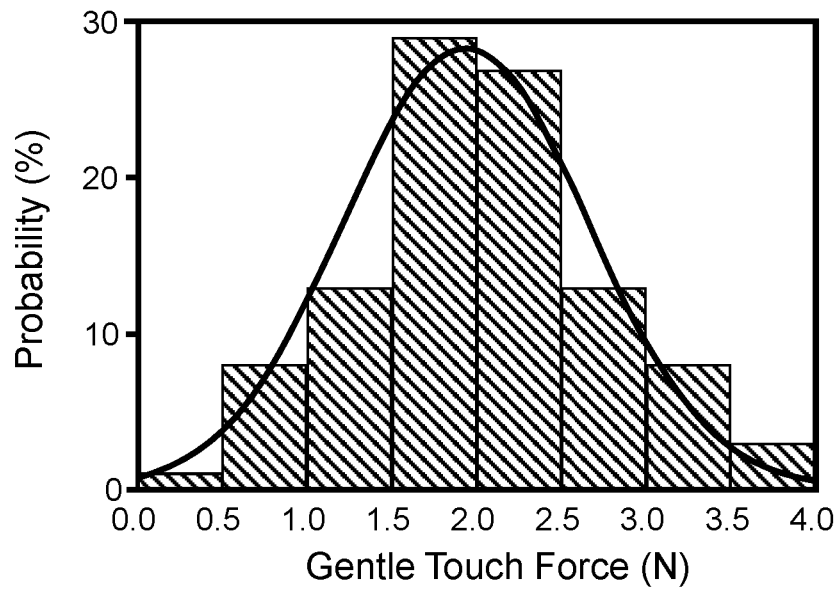
FIG. 15 is a histogram plot showing a distribution of gentle touch forces applied by multiple survey participants.

The device 200 is advantageously configured such that a humanoid softness perception is achievable without force or movement feedback. The device 200 is configured to enable in-sensor signal transformation, such that the Young's modulus of a material is univariate with and can be determined from a measurement signal from the sensor 220. The device 200 is also configured such that the measurement signals obtained are independent of the forces pressing on the surface/the device 200. This is especially relevant in light of the results of a survey summarized by the histogram plot of FIG. 15. The survey was conducted in which gentle touch forces applied by 20 persons were recorded. Each survey participant pressed on a force sensor 10 times with an intention to apply a gentle touch each time, but otherwise without intentional control of the amount of strength of the force used. The histogram of FIG. 15 shows the wide range of force values collected in the survey. It is difficult for the same person to deliver a consistent palpation, and it is even more difficult for different persons to deliver similar amounts of forces during palpation. It is therefore an advantage that the device 200 can be used without regard to the amount of force or the direction of force applied by a user (or a robot) to the cap 250 of the device 200. The device 200 can be used to provide a way for advanced clinical skills like palpation to be delivered more consistently as well as in other applications.

One example of a method 800 of obtaining Young's modulus of a material using based on a measurement signal of the sensor 220 from the device 200 will be described. The method assumes a rigid indenter 230 and a soft material such that $E_i \gg E_s$, where $E_i$ is the Young's modulus of the indenter (more specifically, of the first end 232 of the indenter 230) and $E_s$ is the Young's modulus of the material 50 under test.

The Hertzian contact model provides a way to calculate the Young's modulus of a material, assuming that a uniform distribution of pressure between the rigid and spherical indenter, and assuming elastic deformation from an initially flat surface of the material. The Young's modulus of the material may be expressed as shown below:

$$E_s = \frac{3}{4}(1 - v_s^2) F_{i-s} r_i^{-\frac{1}{2}} h_s^{-\frac{3}{2}} \tag{1}$$

where $E_s$ and $v_s$ are respectively the Young's modulus and the Poisson's ratio of the material (as an example, $v_s$ is a constant and approximately 0.5 for incompressible materials such as PDMS and human tissue), $F_{i-s}$ is the contact force between the indenter and the material, $r_i$ is the radius of the first end of the indenter, and $h_s$ is the material deformation (FIG. 9).

Conventionally, the calculation of the Young's modulus requires two values $F_{i-s}$ and $h_s$ to be known. Conventionally, the laboratory setup for measuring the contact force $F_{i-s}$ and material deformation $h_s$ is bulky and requires a specially cut out sample of the material. In practice, such laboratory setups are not practical for prosthetics or clinical applications.

The device 200 of the present disclosure is configured to transform the two variables contact force $F_{i-s}$ and material deformation $h_s$ into one new variable. The device 200 is configured such that the single new variable is measurable by the sensor 220, doing away with the need to measure the contact force $F_{i-s}$ and the material deformation $h_s$.

Before the device 200 is brought into contact with a surface of a material, the first end 232 of the indenter 230 is configured to extend beyond the base (i.e., protrude from the base) by a tip length represented by $L_p$ (FIG. 3B). When the device 200 is pressed onto the surface, the first end 232 of the indenter is pushed in the axial direction by a tip displacement z, causing the second end 234 of the indenter to activate the sensor 220. The sensor 220 registers a change or produces a measurement signal in response to being pushed in the axial direction by the indenter 230. In the example where the sensor 220 is a stretchable strain sensor, the strain sensor undergoes a change in resistance. Both the tip displacement z and the contact force $F_{i-s}$ may be derived from the strain CI of the strain sensor (FIG. 9). At a time when the external face 211 just touches the surface, the material deformation $h_s$ is equal to the tip length (the length of the indenter 230 outside the base 210, or the length of the indenter 230 extending beyond the external surface 211). Therefore, at this instance, both the contact force $F_{i-s}$ and the material deformation $h_s$ may be expressed as follows:

$$F_{i-s} = \frac{2wt\varepsilon_l E_g \sqrt{\varepsilon_l^2 + 2\varepsilon_l}}{(1 + \varepsilon_l)^2} \tag{2}$$

$$h_s = L_p - \frac{t}{2}\left[1 - (1 + \varepsilon_l)^{-\frac{1}{2}}\right] - L\sqrt{\varepsilon_l^2 + 2\varepsilon_l} \tag{3}$$

where t is the thickness of the strain sensor, w is the width of the strain sensor, and $E_g$ is the Young's modulus of the strain sensor. L is the transverse distance between the indenter 230 and the base 210. Substituting equation (2) and equation (3) into equation (1), the Young's modulus of a material may be expressed in equation (4) below as:

$$E_s = \frac{3wt\varepsilon_l E_g(1-v_s^2)}{2(1+\varepsilon_l)^2} \quad (4)$$

$$r_i^{-\frac{1}{2}}(\varepsilon_l^2 + 2\varepsilon_l)^{\frac{1}{2}}\left[L_p - \frac{1}{2}\left[1-(1+\varepsilon_l)^{-\frac{1}{2}}\right] - L(\varepsilon_l^2 + 2\varepsilon_l)^{\frac{1}{2}}\right]^{-\frac{3}{2}}$$

where $\varepsilon_t$ is determined by the performance of the strain sensor, $$\varepsilon_t = f(R) \quad (5)$$

With this configuration, the Young's modulus of the material becomes univariate with the resistance of the strain sensor:

$$E_s = f(R) \quad (6)$$

To give a sense of the relative size of the values, in some embodiments where the device is used for soft materials, non-limiting exemplary values for $L_p$ may be in the range of 0.7 mm (millimeters) to 1.1 mm and the transverse distance L may be around 1 mm. In some examples, the radius $r_i$ of the first end of the indenter may be about 2.5 mm. In some examples, a thickness t of the strain gauge may be about 350 μm (micrometers), a width w of the strain gauge may be about 2 mm, and a Young's modulus of strain sensor is about 818 kPa. The device 200 may be used on food items, e.g., to test for the ripeness of fruits, and in some measurements taken, the material deformation $h_s$ exhibited by the food item is in a region of about 1 mm.

Figure 16:
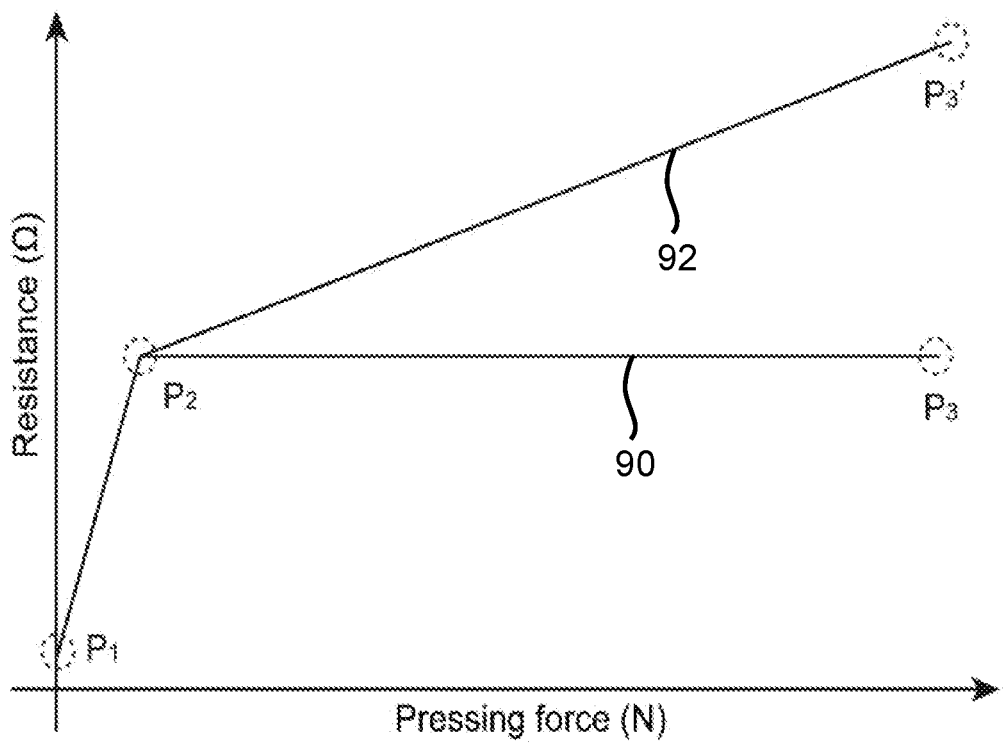
FIG. 16 is a plot of pressing forces against the strain gauge resistance.

The device 200 is configured such that it will automatically provide a measurement signal corresponding to the time instant when the external face 211 of the base 210 just begins to touch the surface 50. Thereafter, even if the user should continue to press the device 200 against the surface, the device 200 will not provide a different measurement signal. This was experimentally verified using a prototype of the device 200. FIG. 16 illustrates a plot of a resistance of sensor 220 in relation to pressing forces on the device 200. Plot 92 corresponds to resistance values read from a strain gauge that was not configured to provide force-independent readings. To apply the Hertzian contact model, it would be desirable to acquire the strain gauge reading at the inflexion point P2. However, using a conventional strain gauge, it is not possible to acquire the reading at P2 without plotting out the changes in resistance over a range of forces. As the pressing forces on the strain gauge increases, the resistance values read from the strain gauge increases. If the strain gauge reading is obtained when the pressing force is too large (e.g., at point P3'), the readings obtained will be inaccurate. In practice, as shown in FIG. 15, it is difficult to deliver just the right amount of "gentle touch" forces.

Plot 90 of FIG. 16 corresponds to the measurement signals obtained from the device 200 which includes a locking device 240. It can be seen that for the device 200 of the present disclosure, constant measurement signal values are output by the device 200 from the point P2 onwards. Point P2 corresponds to the instance when the external face 211 of the base 210 of the device 200 contacts the material. In other words, the device 200 is configured such that the useful reading at P2 is automatically obtainable. Even if the "gentle touch" forces applied on the object/subject via the device 200 is too large, the device 200 is configured to output a useful measurement signal corresponding to the point P2. The device 200 is therefore described as being configured to be force-independent.

Figure 17A:
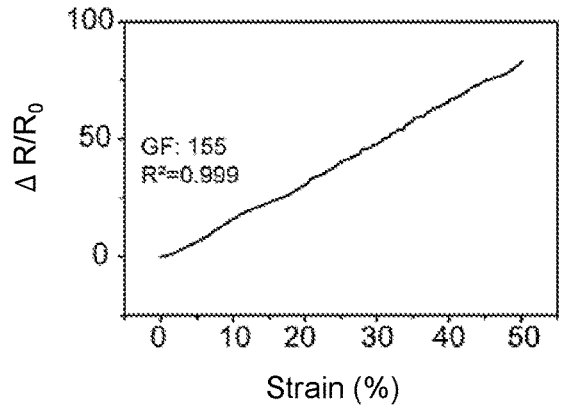
FIGS. 17A to 17F are plots showing the performance of the device of the present disclosure.
Figure 17B:
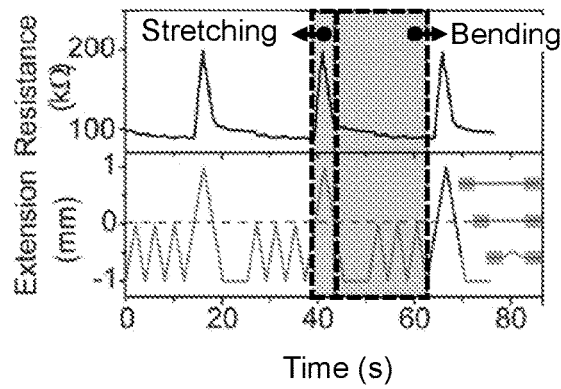
Figure 17C:
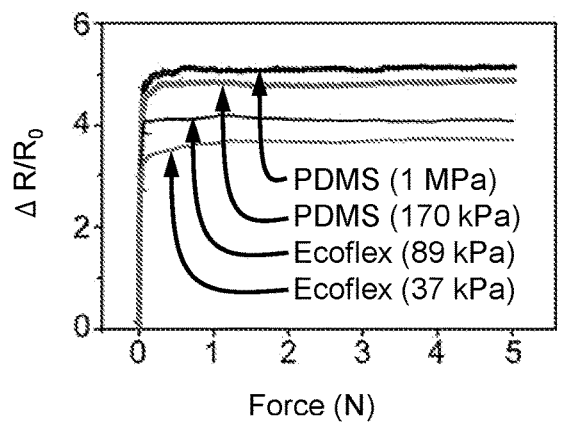
Figure 17D:
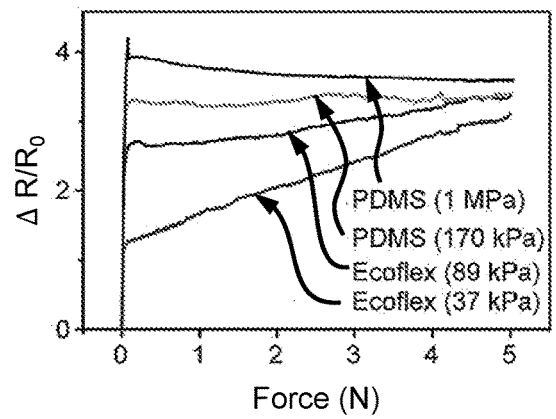
Figure 17E:
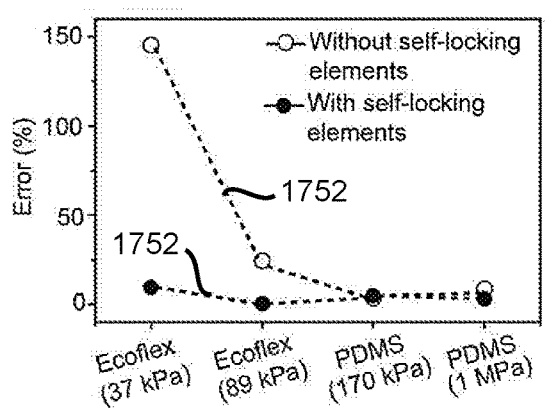
Figure 17F:
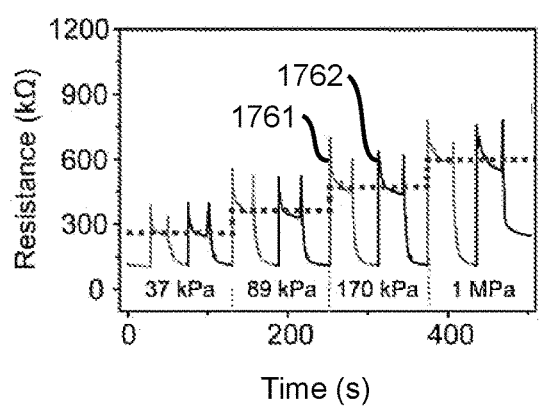

FIGS. 17A to 17F are plots showing the performance of the device of the present disclosure. FIG. 17A shows that the sensor 220 of the device 200 shows good linearity ($R^2$=0.999) and a high sensitivity (gauge factor, GF=155) over a large rage of strain (0~50%). In this example, the sensor is a carbon nanotube-based strain sensor, $R_0$ is the initial resistance, and $\Delta R$ is the change in resistance from the initial resistance. FIG. 17B shows that the strain sensor is coupled to rest of the device 200 such that it is sensitive to stretching and less sensitive (or not sensitive) to bending forces exerted thereon. FIG. 17C shows the strain readings obtained from a device 200 of the present disclosure when used in relation to different materials. FIG. 17C shows results that experimentally verify the force-independent nature of the measurement signals obtained from the device 200. In contrast, FIG. 17D shows the strain readings where there is no force-independent feature, for different materials in cases where the reading obtained were not independent of the forces applied. The different materials tested ranged from and included the softer Ecoflex at 37 kPa and 89 kPa respectively to the relatively harder PDMS at 170 kPa and 1 MPa respectively. FIG. 17E shows that the measurement errors 1751 for the device 200 are significantly smaller (and practically negligible) compared to those of a strain gauge setup that is not force-independent 1752. FIG. 17E also shows that the device 200 outperforms other setups especially for softer materials. FIG. 17F compares the measurement signals obtained from the device 200 when a gentle touch 1761 is applied to different materials via the device 200, and when a heavy touch 1762 is applied to the same. A touch was considered gentle if it does not deform a soft sponge, and a touch was considered heavy if it clearly deforms the sponge. FIG. 17F shows that consistent measurement signals are obtainable independent of the touch being gentle or heavy. It is thus demonstrated that the device 200 can be used to provide a single quantitative measure that is consistent to the multi-parametric result from a conventional TA. It is also demonstrated that the device 200 can be used on a wide range of materials, for example, including but not limited to materials with Young's modulus ranging from 37 kPa to 3.3 MPa. Advantageously, the device 200 performs well on materials with Young's modulus of around 1 MPa and below. The measurement range and accuracy can be tuned by changing the fabrication parameters such as the sizes of each elements and the Young's modulus of the sensor.

Figure 18A:
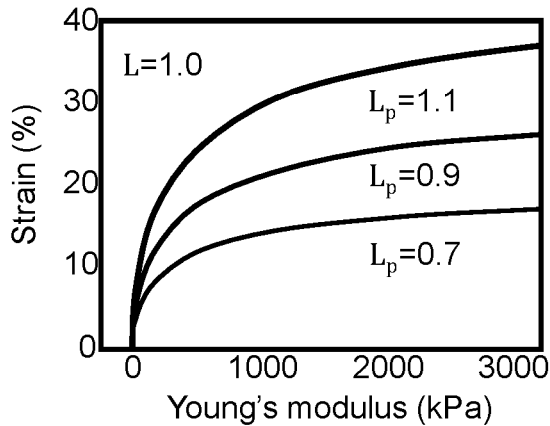
FIGS. 18A to 18F are plots comparing theoretical and experimental Young's modulus.
Figure 18D:
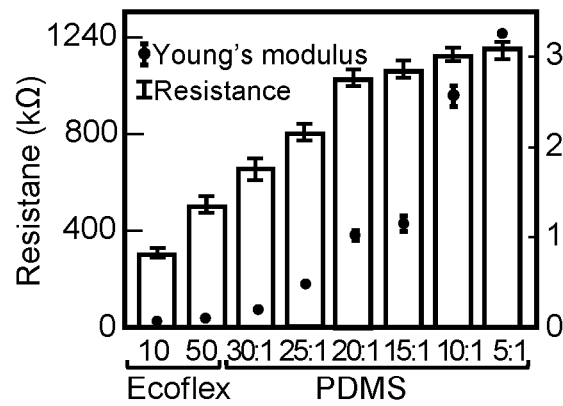
Figure 18B:
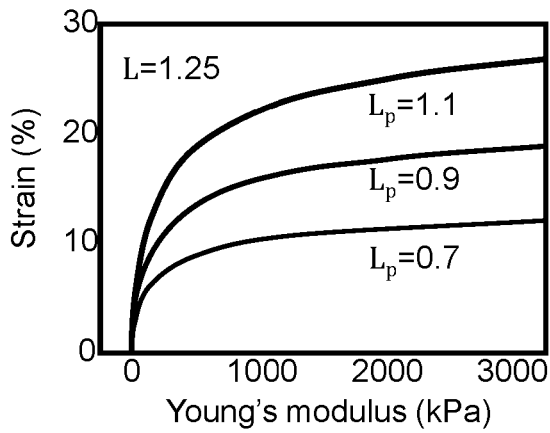
Figure 18E:
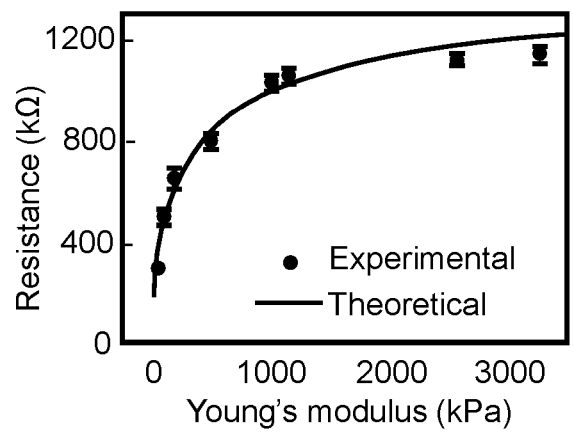
Figure 18C:
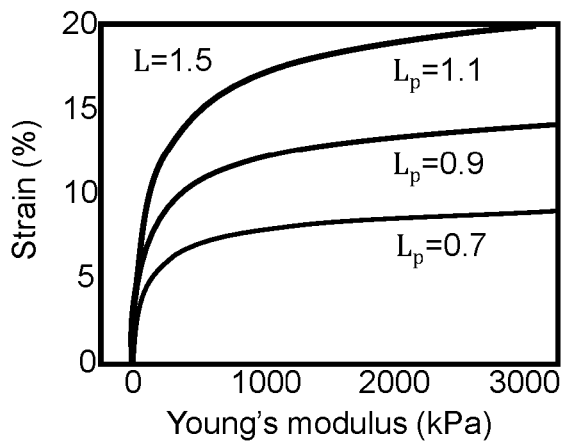
Figure 18F:
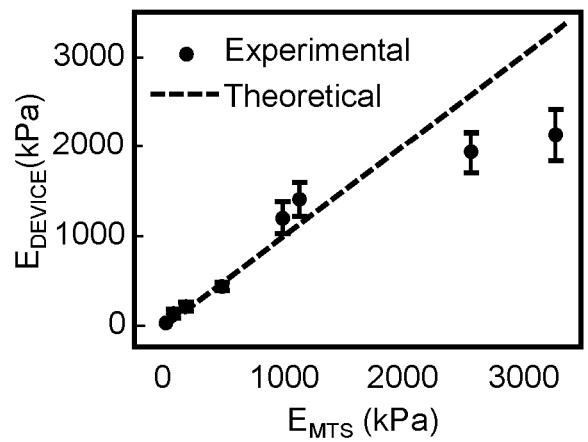

FIGS. 18A to 18F are plots comparing theoretical and experimental Young's modulus obtained using the device 200 of the present disclosure. FIGS. 18A to 18C show theoretical calculations of strain sensor response of the device 200 at different tip lengths ($L_p$) and different indenter-to-base transverse distances (L). The plots suggest that the device 200 is particularly suitable for use with soft materials, e.g., materials with relatively lower Young's modulus). The sensitivity of the device 200 may be tuned by providing a longer $L_p$ or a shorter L. FIG. 18D shows that the measurement signals of the device 200 correspond to resistance values that are consistent with Young's modulus measured using a conventional apparatus. FIG. 18E show that experimental results (dots) and theoretical analysis (curve) of the relationship between the measurement signals and Young's modulus agree well. FIG. 18F show a good correlation between the Young's moduli measured by the device 200 and those measured using the conventional apparatus.

Figure 19:
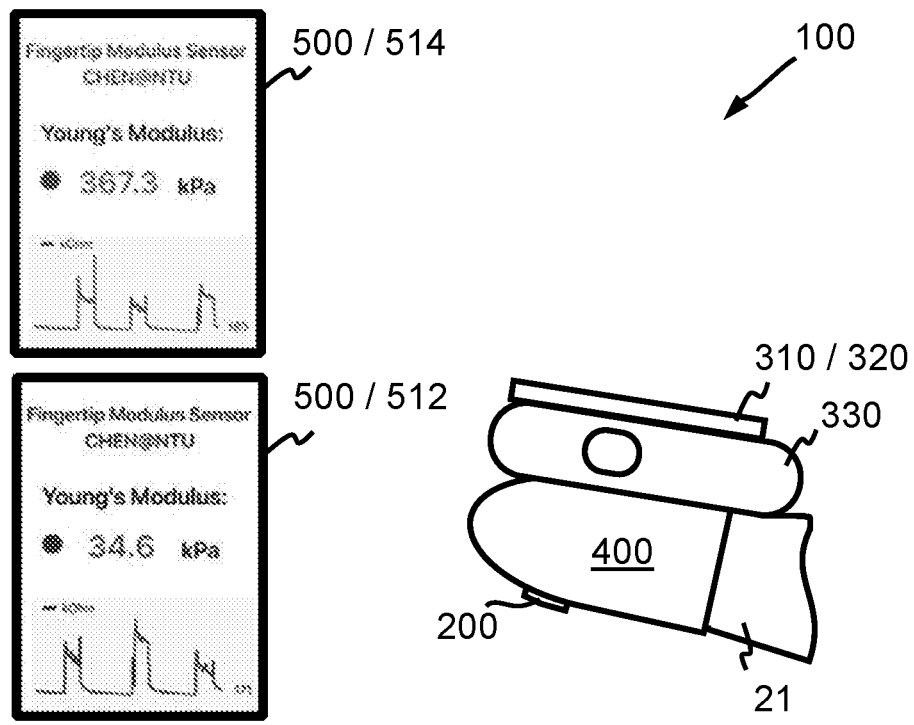
FIG. 19 shows a system for quantifiable palpation according to an embodiment.

FIG. 19 is a non-limiting example of a prototype according to an embodiment of the present disclosure. This prototype was used in experiments to test the performance of the device 200 and system 100 in providing quantifiable palpation. The system 100 includes the device 200 coupled to an attachment 400 (such as a prosthetic finger glove that can be worn on a user's fingertip 21). The system 100 includes a processor 310, a Bluetooth transmitter 320, and a power bank 330. The system 100 was configured such that the haptic device 300 was configured to communicate wirelessly with a computing device (not shown) having a user interface. Other computing devices may be used, e.g., laptops, tablets, etc. In the experiments, the computing device used was a mobile phone. The user interface 500 is configured to display the Young's modulus value in real-time to facilitate clinical diagnosis. Also illustrated is the user interface showing a Young's modulus determined for a healthy instep 512 and for a swollen instep 514.

Figure 20:
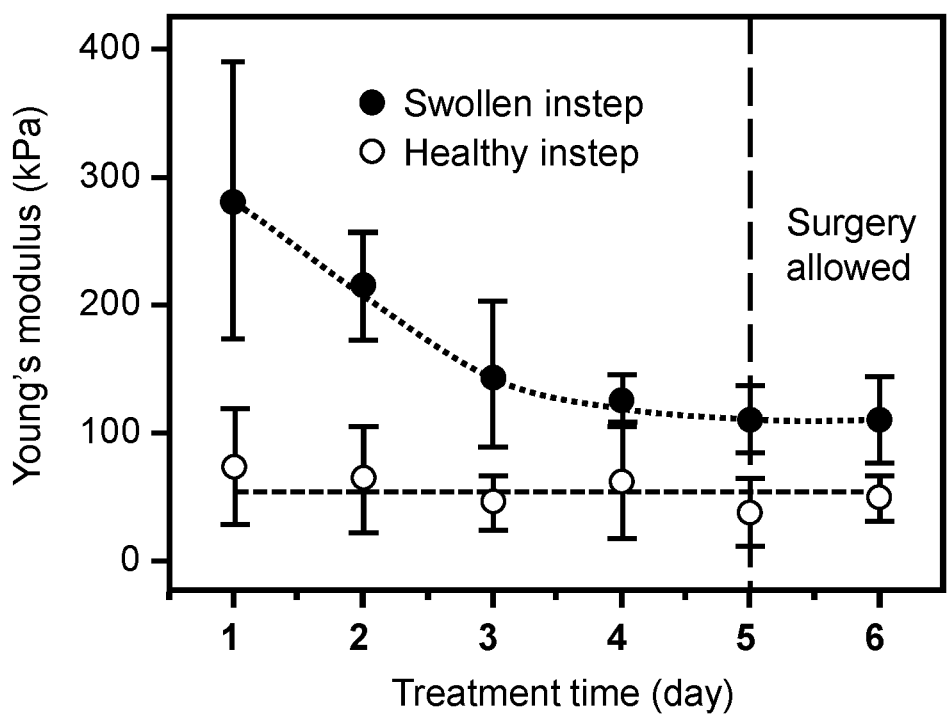
FIG. 20 is a plot of measurements for both a healthy instep and a swollen instep obtained from the system of FIG. 19.

The system 100 was employed to palpate and assess the status of swollen tissues in patients suffering from joint damage. FIG. 20 shows the Young's modulus measurements of both the swollen and healthy instep of a patient obtained from the system 100. The system 100 shows that the swollen instep subsided after four days and surgery is recommended on the fifth day, this matched a medical professional's assessment. The error bars in FIG. 20 are standard deviations calculated from at least five measurements. Besides surgical recommendations, the quantitative data obtained using the system 100 may also be used for any study that requires monitoring changes in softness. For example, to assess the effects of drugs on swelling, or the progression of tumours.

Figure 21:
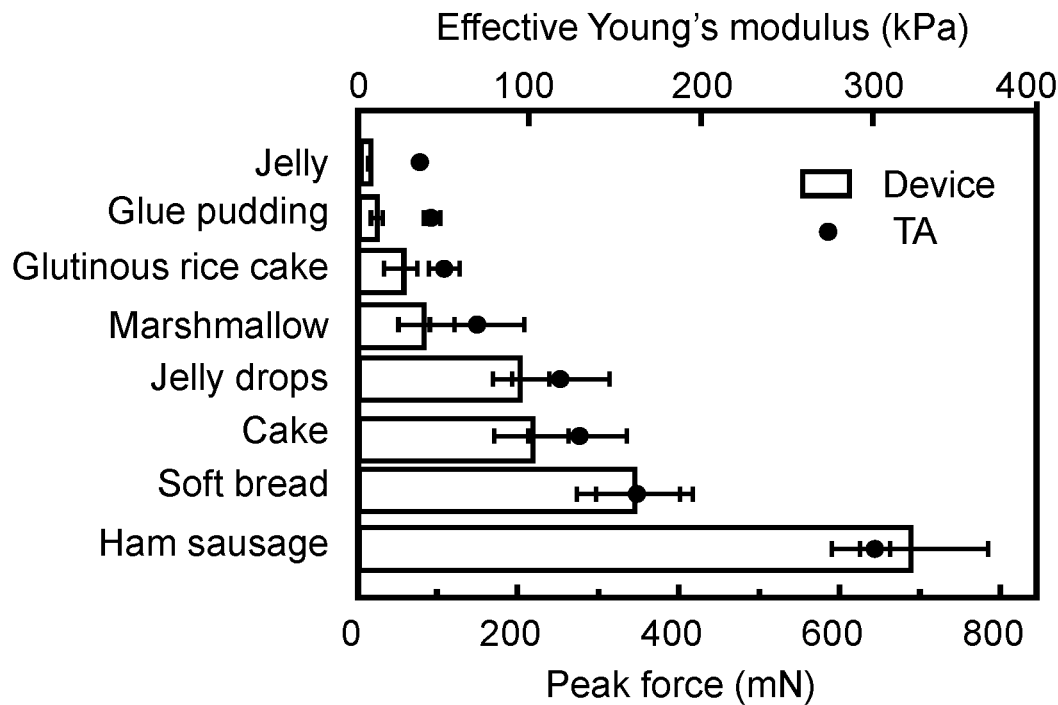
FIG. 21 is a plot of measurements for a variety of soft materials.
Figure 22:
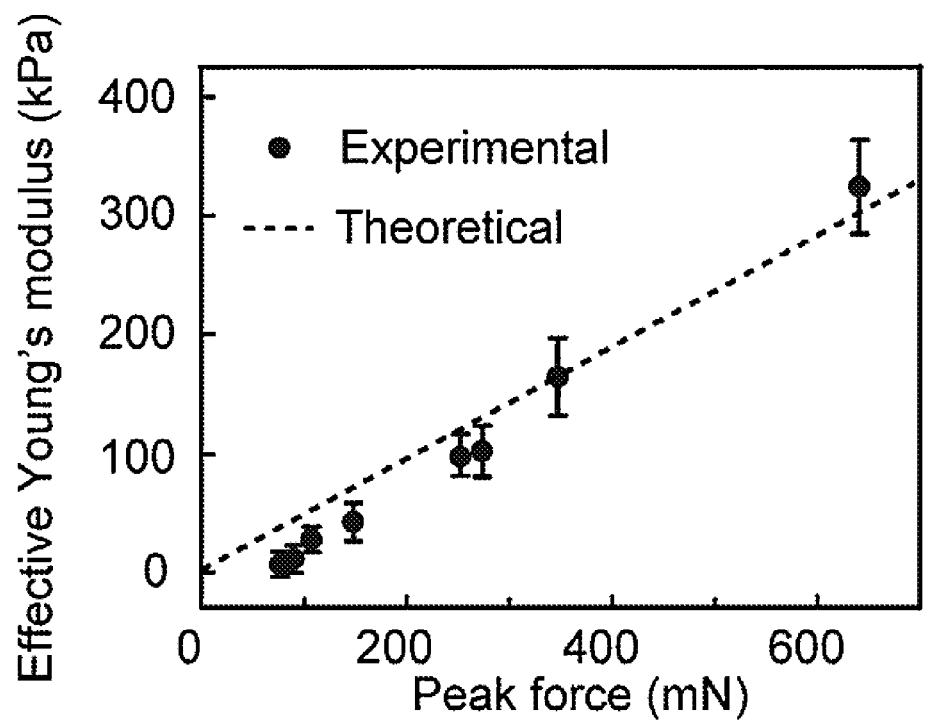
FIG. 22 is a plot comparing measurements of FIG. 21 and theoretical computations.

FIG. 21 illustrates another embodiment wherein the device 200 is employed as a convenient artificial haptic for distinguishing softness of a variety of soft materials, such as jelly, glue pudding, marshmallow, cake, ham sausage, etc. Young's moduli (bar in FIG. 21) measured by the device 200 corresponds to the trend of peak forces (dots in FIG. 21) measured by a commercial texture analyzer (TA) for measuring softness of various foods. FIG. 22 shows a good correlation between Young's moduli obtained using the device and peak forces measured using a TA, which demonstrates accuracy of the device 200. Dots are experimental data from FIG. 21 and the dashed line represents theoretical results calculated from equation (1) of the Hertzian contact model ($r_i$=2.5 mm, $h_s$=1 mm, =0~700 mN). Error bars in FIGS. 21 and 22 are standard deviation calculated from nine measurements.

Figure 23:
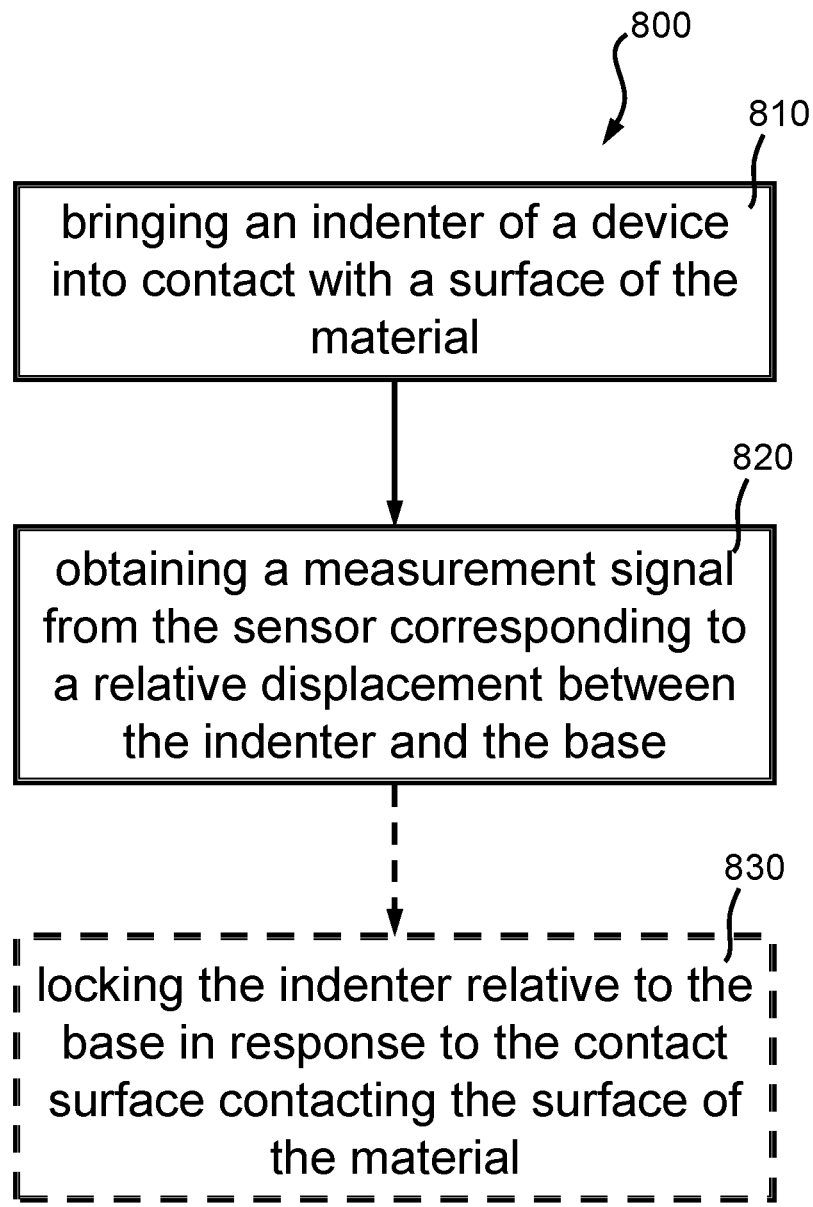
FIG. 23 is a schematic flow chart showing a method according to an embodiment of the present embodiment.

FIG. 23 shows a method 800 of measuring a degree of softness of a material. The method 800 includes bringing an indenter of a device into contact with a surface of the material 810, with the indenter protruding from a contact surface of the base, and the indenter being configured to retract inwardly relative to the base such that the indenter provides a push force to the sensor in the axial direction. The method 800 includes obtaining a measurement signal from the sensor corresponding to a relative displacement between the indenter and the base 820, in which the relative displacement is limited by the contact surface being brought into contact with the surface of the material. The method 800 may further include, before obtaining the measurement signal, locking the indenter relative to the base in response to the contact surface contacting the surface of the material 830. In some embodiments, the measurement signal corresponds to a quantitative measure of the degree of softness of the material. In some embodiments, the measurement signal corresponds to the Young's modulus value of the material.

In various embodiments described above, a device for measuring a property of a material is disclosed. The property of the material may be a measure of a softness of the material. The softness of the material may be quantitatively determined based on a Young's modulus value of the material. In some embodiments, the device is configured to operably provide a measurement signal concurrent with a locked state. The measurement signal may correspond to a quantitative measure of the property of the material, for example, the measurement signal corresponds to a Young's modulus value of the material. In some embodiments, the measurement signal is directly correlatable to the Young's modulus value of the material. In other embodiments, measurement signal corresponds to a quantitative measure of a haptic sensation of the material. The quantitative measure may be representative of different haptic sensations such as "soft", "stiff", "swollen", etc. The device may be employed in various applications such as for medical diagnosis, for virtual and augmented reality applications, or even for daily tasks such as determining softness of food.

To aid understanding and not to be limiting, one exemplary method of fabricating a device 200 will be described with the aid of FIG. 4 and FIGS. 24A to 24D.

Figure 24A:
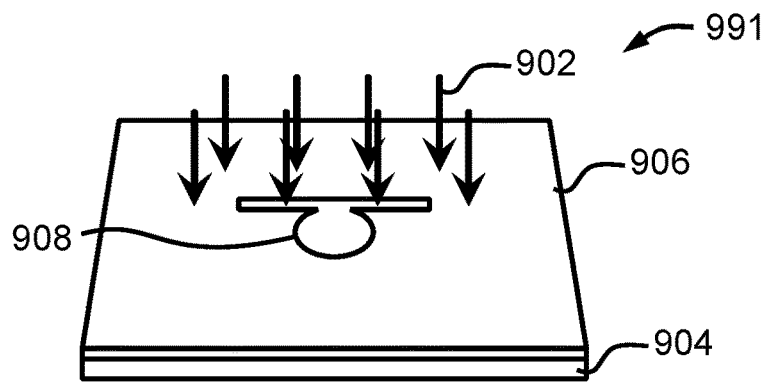
FIGS. 24A to 24D are schematic diagrams showing a method of fabricating one example of a sensor.
Figure 24B:
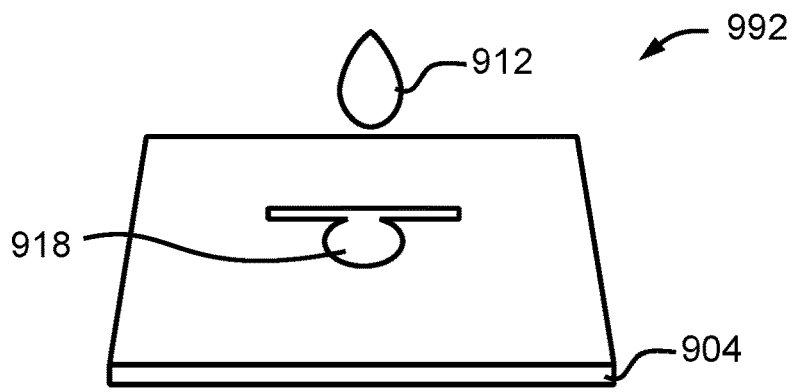
Figure 24C:
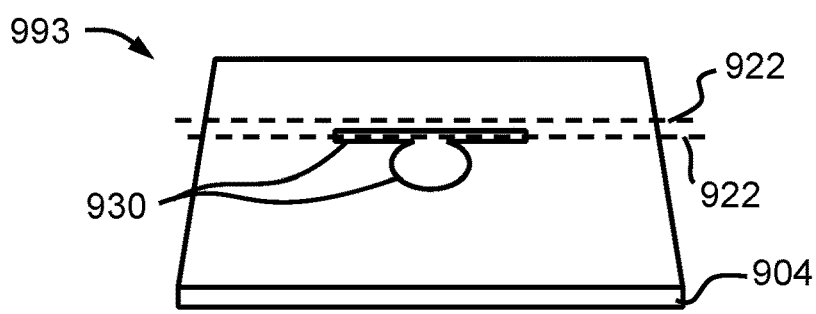
Figure 24D:
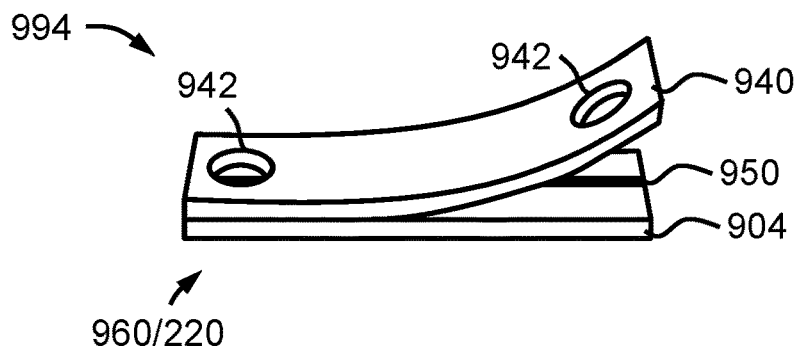

In this non-limiting example, the sensor 220 includes a strain sensor or a strain gauge. To form a linear and highly sensitive stretchable strain sensor, a silicon wafer is first treated with oxygen plasma 902 (150 Watts, 60 seconds, 450 mTorr) and then treated by the vapor of (tridecafluoro-1,1, 2,2-tetrahydrooctyl)-1-trichlorosilane on a hot plate at 180° C. for 2 h (FIG. 24A). PDMS 904 (available as Sylgard 184 from Dow Corning) is prepared by mixing a base with a crosslinker (in a mass ratio of 10:1), degassed (centrifuge at 5000 revolutions per minute for 5 minutes), and spin coated (500 revolutions per minute for 45 seconds) on the silicon wafer, followed by baking at 60° C. for 4 hours. After curing, the PDMS is peeled off and then covered by a metal mask 906 with a predetermined pattern 908, followed by hydrophilic treatment with oxygen plasmonic (150 Watts, 90 seconds, 450 mTorr). The exposed area thus becomes hydrophilic. Next, a carbon nanotube (CNT) solution 912 (P3-SWNT, Carbon solution) is dropped onto the hydrophilic area 918 of the PDMS (FIG. 24B). When the CNT solution has evaporated for several hours at room temperature, a coffee ring (CNT ring 930) is formed along the edge of the hydrophilic area, with the same pattern of the metal mask. The PDMS is cut along a cutting profile 922 as shown by the dashed lines in FIG. 24C. The PDMS is then covered by another PDMS strip (a pre-cured PDMS with the same thickness) 940. The upper PDMS strip has two holes 942 at its ends which are used to attach Gallium-Indium eutectic (EGaIn) as electrodes of the sensor. After a further bake at 60° C. for 4 hours, the resulting product is cut into a strip with a width of 2 mm, a thickness of about 350 μm, and a CNT straight line 950 can be found located at the center of the sandwich structure.

It will be understood that while the method of making an intrinsically large-deformation strain sensor has been described as a method of providing a sensor 220, other types of sensors may be selected for use as part of the device 200. While strain sensors and pressure sensors are examples of sensors that may be selected for use as part of the device 200, the device 200 advantageously is operable with a wide range of sensors to suit different applications. For example, the sensor 220 may include a strain sensor (also referred to as a large-deformation strain sensor or a stretchable strain sensor) as described above, i.e., one that is intrinsically characterized by a relatively large deformation upon a relatively small push force or a relatively small displacement. Alternatively, the sensor 220 may include a strain sensor selected from conventional strain gauges. In other embodiments, the sensor 220 may include a strain sensor resiliently coupled to an indenter with a resilient member, such as a leaf spring or a cantilever spring, coupled between the indenter and the strain sensor. When the indenter is displaced towards the strain sensor, the resilient member is deformed and a push force from the indenter bears on the strain gauge to give a measurement signal. Conventional strain gauges may be configured such that they can only deform slightly or deform less than a large-deformation strain sensor, and may be selected for applications where availability and cost efficiencies are more important considerations than having a more sensitive sensor. Alternatively, the sensor 220 may include a pressure sensor, i.e., a sensor configured to provide a measurement signal in response to receiving a pressure (with or without a resulting mechanical deformation). In some examples, the sensor 220 includes a pressure sensor that is intrinsically characterized by a relatively large deformation upon receiving a relatively small pressure (also referred to as a large-deformation pressure sensor or a stretchable pressure sensor). Alternatively, the sensor 220 may include a conventional pressure sensor with a deformable structure that undergoes a relatively small deformation (such as the example of FIGS. 11 and 12). The pressure sensor may be one deformable into a deformed state by the indenter pushing against the pressure sensor to operably provide a measurement signal in response to receiving the push force. In some alternative embodiments, the pressure sensor may be a thin film pressure sensor or a resistive ink pressure sensor. The sensor 220 may be configured to provide measurement signals based on resistance values, capacitance, voltages, etc.

Figure 25A:
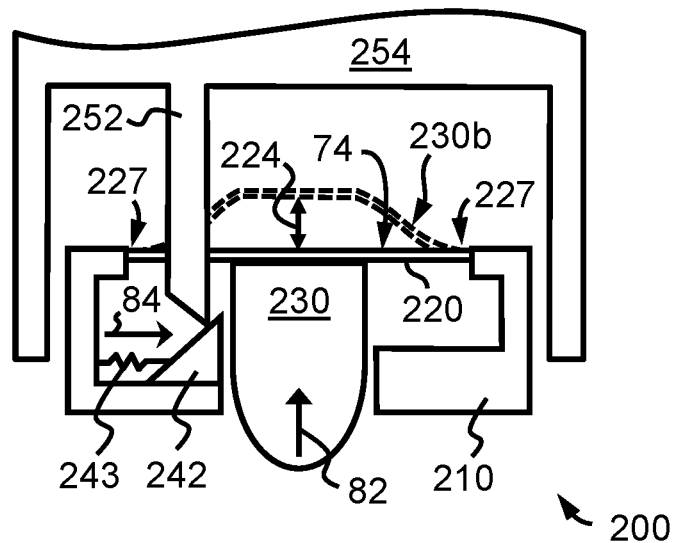
FIGS. 25A to 25C are schematic diagrams showing alternative embodiments of the device.
Figure 25B:
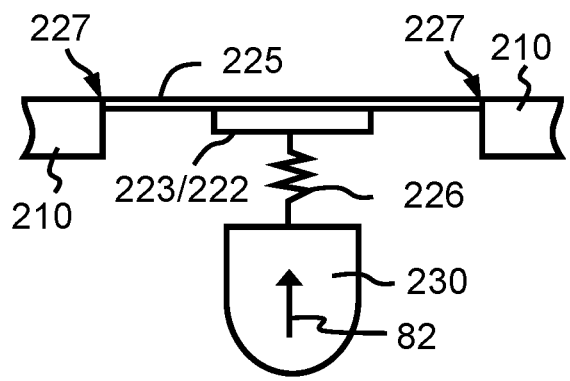
Figure 25C:
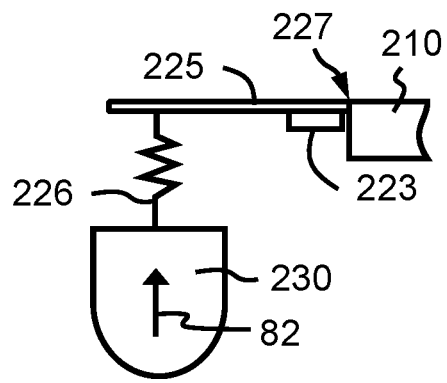

Examples of different embodiments of the device 200 include but are not limited to those schematically illustrated in FIGS. 25A to 25C. FIG. 25A is a partial schematic diagram showing the tab 254 with an actuating leg 252 in interface with a sloped surface of a clamp element 242. The clamp element 242 is coupled to the base 210 via a resilient coupling 243. The resilient coupling 243 may include but is not limited to a leaf spring. The resilient coupling 243 may be oriented differently from the schematic representation shown in FIG. 25A. The sensor 220 is in a fixed coupling 227 with the base 210, with part of the sensor 220 being deformable by the indenter 230 from an undeformed state (in which the sensor 220 is substantially disposed in the transverse plane 74) to a deformed state by an offset 224. Movement of the indenter 230 in the axial direction 82 is limited. The actuating leg 252 causes the corresponding at least one clamp element 242 to move in the clamping direction 84 and releasably lock the indenter 230 such that the locked state 230b corresponds to a deformed state. FIG. 25B schematically illustrates part of another embodiment of the device 200 with some components omitted for the sake of clarity. The sensor 220 includes a beam 225 in a fixed coupling 227 with the base 210 and a sensing element 223 (such as but not limited to a pressure sensor 222) coupled to the beam 225. The sensing element 223 may be coupled to the indenter 230 via a resilient member 226. FIG. 25C is a partial schematic diagram of yet another embodiment of the device 200. The sensor 220 includes a beam 225 in a fixed coupling 227 with the base 210 and a sensing element 223 (such as but not limited to a strain gauge) coupled to the beam 225. The beam 225 is cantilevered relative to the base 210. A free end of the beam 225 is coupled to the indenter 230 via the resilient member 226.

To fabricate the rest of the device 200, methods including but not limited to additive manufacturing or 3D printing may be used. For example, for some of the experiments conducted, parts of the device 200 were printed using a commercial 3D printer (Eden 260V available from Stratasys). The materials used include RGD 525 and VeroClear, and the supporting material used is FullCure 705. The indenter 230 was printed with RGD 525 so as to provide a rounded or substantially hemispherical tip (first end 232) with a Young's modulus (E) in a region of 2~3 GPa. That is, so that the indenter 230 can be considered as a rigid indenter compared with the targeted material to be measured (Young's modules (E)<4 MPa).

The method of assembling the device 200 may depend on the manner in which the parts are 3D printed. The method may include, for example but is not limited to, inserting the indenter 230 into a base 210 with the tip (first end 232) extending beyond the base 210. was inserted. The base 210, the indenter 230, and the sensor 220 were then treated by oxygen plasma (150 Watts, 90 seconds, 450 mTorr) to increase the surface energy. Next, the sensor 220 (such as the linear stretchable strain sensor described above) was coupled to the respective supports 214 of the base 210, e.g., by an adhesive. The second end 234 of the indenter 230 may be coupled to a deformable/displaceable/sensing part of the sensor 220, e.g., by an adhesive. The adhesive used may be an epoxy resin adhesive, and the parts may be kept at room temperature for 24 hours for curing. Finally, the cap 250 was assembled with the base 210. The cap 250 and the base 210 may be prevented from separating from one another by two pairs of pothooks or flexible fasteners. A microcontroller unit (e.g., an Arduino Nano module such as ATmega328P) may be added to read the measurement signals and a Bluetooth transmitter module (e.g., HC-06 Bluetooth module) may be added to communicate the measurement signals.

Alternatively described, making reference to FIG. 4, a method of fabricating a device 200 according to embodiments of the present disclosure may include: coupling a strain gauge/sensor 220 to a base 210 such that the strain gauge in an undeformed state has a first planar surface disposed in a transverse plane 74; assembling an indenter 230 with the base 210 such that a first end 232 of the indenter protrudes from a contact surface/contact end 215 of the base 210 and a second end 234 of the indenter is proximal the first planar surface of the strain gauge/sensor 220, the indenter 230 being configured for relative displacement with the base along a displacement axis/axial direction 82 normal to the transverse plane 74 such that the second end 234 deforms the strain gauge/sensor 220 out of the transverse plane by an offset 224 along the displacement axis/axial direction 82; and disposing a pair of clamps/one or more clamp element 242 about the indenter 230, the pair of clamps/one or more clamp element 242 being configured to be actuated by a cap 250 in slidable engagement with the base 210, such that the offset 224 is limited. Making reference to FIGS. 24A-24D, the method as described above, wherein the sensor 220 includes a strain gauge, the strain gauge being made by a process comprising: providing a metal mask 906 on a first polymer film 904 (991); treating an exposed portion 908 of the polymer film with oxygen plasma 902 to form a hydrophilic area 918 (991); disposing an aqueous mixture of carbon nanotube (CNT) 912 on the hydrophilic area 918 to form a CNT coffee ring 930 (992/993); and sealing the CNT coffee ring 930 with a second polymer film 940 to form a layered structure 960 (994).

The device 200 is useful in a wide range of applications. For example, the device 200 may be part of a cosmetic tool or beauty aid. The device 200 may be integrated in mobile cosmetic devices to monitor or test skin elasticity. Since the device 200 can provide meaningful measurement signals even in situations where the user is not a trained professional, the device 200 can be configured as a consumer product suitable for daily use by the average consumer. The device 200 may also be provided in the form of medical instruments for use in clinical diagnosis or in the form of surgical instruments. The device 200 may also be provided in the form of a mechanical characterization instrument that is more portable, cost efficient, and easier to use, compared to conventional material characterization instruments found in the typical laboratory. From the above description, it can be understood that the term "measuring" a property of a material can be understood broadly to include providing a quantitative measurement, an indication of whether the property is above or below a threshold, an indication of whether the property is within a range, etc. The device 200 can be configured to measure materials with Young's modulus larger than 1 MPa.

All examples described herein, whether of apparatus, methods, materials, or products, are presented for the purpose of illustration and to aid understanding, and are not intended to be limiting or exhaustive. Various changes and modifications may be made by one of ordinary skill in the art without departing from the scope of the invention as claimed.

The invention claimed is:

1. A device configured to measure a property of a material, the device comprising:
    a base;
    a sensor, the sensor being in a fixed coupling with the base;
    an indenter, the indenter being slidably coupled to the base to move relative to the base in an axial direction in response to a first abutment of the indenter with a surface of the material such that the indenter provides a push force to the sensor in the axial direction; and
    a locking device, the locking device being configured to releasably lock the indenter in a locked state in response to a second abutment of the base with the surface of the material, wherein the indenter in the locked state is prevented from moving relative to the base in the axial direction.

2. The device according to claim 1, wherein the sensor is configured to operably provide a measurement signal in response to receiving the push force.

3. The device according to claim 1, wherein the sensor is configured to operably provide a measurement signal concurrently with the indenter being in the locked state.

4. The device according to claim 3, wherein the measurement signal corresponds to a Young's modulus value of the material.

5. The device according to claim 3, wherein the measurement signal corresponds to a quantitative measure of a haptic sensation of the material.

6. The device according to claim 1, wherein the sensor comprises:
    a strain gauge, the strain gauge being having opposing edges in the fixed coupling with the base such that the strain gauge is disposed in a transverse plane in an undeformed state, the transverse plane being normal to the axial direction, and wherein the strain gauge is deformable into a deformed state by the indenter pushing against the strain gauge, the strain gauge in the deformed state being partially displaced out of the transverse plane by an offset in the axial direction.

7. The device according to claim 6, wherein the indenter is configured to contact the strain gauge.

8. The device according to claim 6, wherein the strain gauge is deformed by the indenter in the locked state to provide a strain gauge reading corresponding to a Young's modulus value of the material.

9. The device according to claim 6, wherein the indenter comprises:
    a first end, the first end being disposed beyond the base and configured to be brought into contact with the surface of the material; and
    a second end, the second end being disposed proximal to the sensor,
    wherein the indenter defines an indenter axis extending through the first end and the second end, and wherein the indenter axis is parallel to the axial direction when the indenter is in the locked state.

10. The device according to claim 9, wherein the first end is characterized by a Young's modulus value that is larger than a Young's modulus value of the material.

11. The device according to claim 9, wherein the first end comprises a hemispherical tip.

12. The device according to claim 6, wherein the locking device comprises:
    a cap, the cap being coupled to the base; and
    at least one clamp element, the at least one clamp element being resiliently coupled to the base, wherein the at least one clamp is configured to be displaced by the cap in a clamping direction non-parallel to the axial direction such that the at least one clamp element releasably locks the indenter in response to the second abutment.

13. The device according to claim 12, wherein the locking device comprises at least two clamp elements, the at least two clamp elements being diametrically disposed about the indenter and configured to cooperatively releasably lock the indenter.

14. The device according to claim 12, wherein each of the at least one clamp element defines a sloped surface inclined relative to the clamping plane.

15. The device according to claim 14, wherein each of the at least one clamp element defines an increasing thickness towards the indenter.

16. The device according to claim 12, wherein the cap is biased apart from the base by a spacing if the indenter is in the unlocked state, and wherein the cap is responsive to a force to move relative to the base opposite the axial direction.

17. The device according to claim 14, wherein the cap is slidably engageable with the sloped surface such that a movement of the cap opposing the axial direction relative to the base is translated to a movement of the at least one clamp element in the clamping direction to releasably lock the indenter.

18. The device according to claim 17, wherein the cap comprises:
    a tab; and
    at least one actuating leg extending from the tab parallel and opposite to the axial direction, the at least one actuating leg being slidably engageable with the sloped surface, wherein the cap and the base are telescopically moveable to releasably lock the at least one clamp element with the indenter.

19. The device according to claim 12, wherein a displacement of the at least one clamp element in the clamping direction brings the at least one clamp element into an abutment with the indenter at a locking location, wherein the locking location is one selected from a continuum of potential locking locations along an indenter body of the indenter.

20. The device according to claim 19, wherein the indenter body defines an indenter axis extending through a first end of the indenter and a second end of the indenter, and wherein the abutment of the at least one clamp element with the indenter disposes the indenter axis to be parallel to the axial direction.

\* \* \* \* \*